United States Patent
Mannstadt et al.

(10) Patent No.: US 12,496,330 B2
(45) Date of Patent: Dec. 16, 2025

(54) METHODS OF IMPROVING SPINAL FUSION WITH ABALOPARATIDE

(71) Applicant: Radius Health, Inc., Boston, MA (US)

(72) Inventors: Beate Klara Maria Mannstadt, Arlington, MA (US); Bruce Mitlak, Boston, MA (US)

(73) Assignee: Radius Health, Inc., Boston, MA (US)

( * ) Notice: Subject to any disclaimer, the term of this patent is extended or adjusted under 35 U.S.C. 154(b) by 788 days.

(21) Appl. No.: 17/692,818

(22) Filed: Mar. 11, 2022

(65) Prior Publication Data

US 2022/0193203 A1 Jun. 23, 2022

Related U.S. Application Data

(63) Continuation of application No. PCT/US2020/050729, filed on Sep. 14, 2020.

(60) Provisional application No. 62/899,633, filed on Sep. 12, 2019.

(51) Int. Cl.
| | |
|---|---|
| *A61K 38/29* | (2006.01) |
| *A61P 19/00* | (2006.01) |
| *A61P 19/08* | (2006.01) |
| *A61P 41/00* | (2006.01) |

(52) U.S. Cl.
CPC .............. *A61K 38/29* (2013.01); *A61P 19/00* (2018.01); *A61P 19/08* (2018.01); *A61P 41/00* (2018.01)

(58) Field of Classification Search
CPC ...................................... A61K 38/29
See application file for complete search history.

(56) References Cited

U.S. PATENT DOCUMENTS

| | | |
|---|---|---|
| 2002/0077281 A1 | 6/2002 | Vickery |
| 2017/0065682 A1* | 3/2017 | Hattersley .............. A61P 19/08 |
| 2017/0368148 A1 | 12/2017 | Hattersley |
| 2019/0091138 A1 | 3/2019 | Hattersley et al. |

FOREIGN PATENT DOCUMENTS

WO   WO-2005038453 A1   4/2005

OTHER PUBLICATIONS

Seki et al., Eur. Spine J., 2017, vol. 26:2121-2127.*
Miller et al: "Effect of Abaloparatide vs Placebo on New Vertebral Fractures in Postmenopausal Women With Osteoporosis : A Randomized Clinical Trial", The Journal of the American Medical Association, vol. 316, No. 7, Aug. 16, 2016, p. 722.
Miller et al: "Effect of Abaloparatide vs Placebo on New Vertebral Fractures in Postmenopausal Women With Osteoporosis : A Randomized Clinical Trial", The Journal of the American Medical Association, vol. 316, No. 7, 2016-08-16, p. 722.
Chandler et al: "Abaloparatide, a novel osteoanabolic PTHrP analog, increases cortical and trabecular bone mass and architecture in orchiectomized rats by increasing bone formation without increasing bone resorption", Bone, Pergamon Press, Oxford, GB, vol. 120, Oct. 19, 2018, pp. 148-155.
Clinical Trial: "Phase II Trial of Abaloparatide vs. Placebo in Post-Menopausal Women Receiving Initial Spinal Fusion Surgery", ClinicalTrials.gov Identifier: NCT03841058 (2019).
Liu, et al., "Anabolic agents: what is beyond osteoporosis?", Osteoporosis International, vol. 29(5):1009-1022 (2018).
Thompson, et al., "Abaloparatide and the Spine: A Narrative Review", Clinical Interventions in Aging, vol. 15, pp. 1023-1033 (2020).
International Search Report and Written Opinon of related PCT/US2020/050729 mailed Dec. 21, 2020, 14 pages.

* cited by examiner

*Primary Examiner* — Xiaozhen Xie
(74) *Attorney, Agent, or Firm* — WOMBLE BOND DICKINSON (US) LLP; Danielle L. Herritt; Scott R. Breining

(57) ABSTRACT

Provided herein are methods of enhancing spinal fusion and bone formation in subjects with spinal fractures, deformities or instability in the spine. The method includes administering (e.g., subcutaneously or transdermally) a therapeutically effective amount of abaloparatide to the subject.

11 Claims, 12 Drawing Sheets

Specification includes a Sequence Listing.

43 transverse slices (≈3mm)

1/18th of vertebral body height

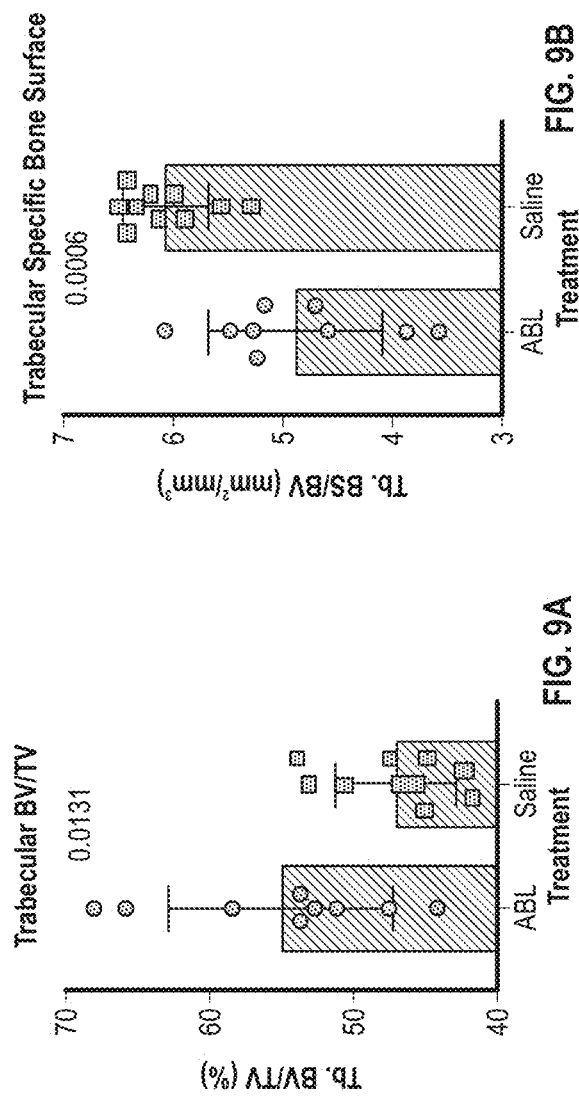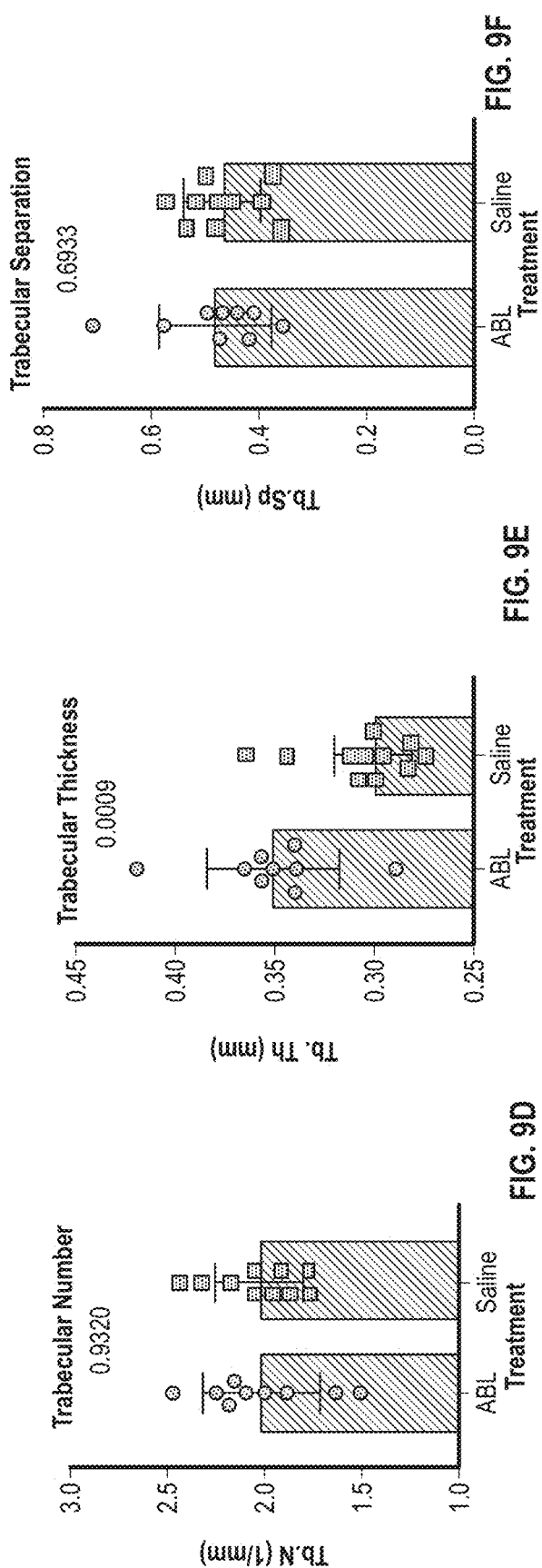

METHODS OF IMPROVING SPINAL FUSION WITH ABALOPARATIDE

CROSS-REFERENCE TO RELATED APPLICATIONS

This application is a continuation of International Application No. PCT/US2020/050729, filed Sep. 14, 2020, and claims the benefit of U.S. Provisional Application No. 62/899,633 filed on Sep. 12, 2019, the entire contents of each of which is incorporated herein by reference for all purposes.

SEQUENCE LISTING

This application incorporates by reference the Sequence Listing contained in the ASCII text file with the file name R105231 1200 PCT.txt, created Sep. 8, 2020 with the size of 1.14 KB, being submitted concurrently herewith.

BACKGROUND OF THE INVENTION

Spinal fusion is typically an effective treatment for fractures, deformities, or instability in the spine to relieve pain and stabilize the spine. The number of spinal fusion discharges has significantly increased to >400K per year. However, complications like nonunion and hardware failure are common and to date no systemically administered drug is approved to improve the outcome of spinal fusion surgery.

There remains an unmet need for agents that enhance spinal fusion and promote bone formation in subjects with spinal fractures, deformities, or instability in the spine.

BRIEF SUMMARY OF THE INVENTION

Provided herein are methods of treating a subject having a spinal fracture. In some embodiments, treatment includes enhancing spinal fusion, promoting bone formation, and/or enhancing healing after spinal surgery in a subject having a spinal fracture. In some embodiments, the subject undergoes pre-treatment prior to surgery.

In one aspect, provided herein is a method of enhancing spinal fusion, including administering to a subject having a spinal fracture, a therapeutically effective amount of abaloparatide, such that spinal fusion is enhanced in the subject. In some embodiments, the spinal fusion occurs between two adjacent vertebrae. In other embodiments, the spinal fusion occurs between multiple vertebrae. In some other embodiments, administering abaloparatide improves bone health throughout the body to prevent other skeletal fractures. In specific embodiments, administering abaloparatide improves bone health to prevent fractures adjacent to the fused segment. In some embodiments, the subject undergoes a surgical procedure concurrently with the administration of the abaloparatide. In other embodiments, the subject undergoes a surgical procedure in at least the first three months after the initial administration of the abaloparatide. In specific embodiments, the subject is being pre-treated for at least 3 months with abaloparatide before surgical procedure. In certain embodiments where the subject undergoes a surgical procedure, the surgical procedure involves implantation in the subject a device selected from a group consisting of screws, spinal wires, artificial ligaments, vertebral cages, and artificial disks. In other embodiments, the subject undergoes a surgical procedure that uses transplanted bone or bone tissue (i.e. bone graft). In some embodiments of the method, the surgical procedure is an anterior or a posterior surgical procedure. In a specific embodiment, the surgical procedure is a posterior surgical procedure involving posterolateral fusion.

In another aspect, provided herein is a method of promoting bone formation, including administering to a subject having a spinal fracture, a therapeutically effective amount of abaloparatide, such that bone formation is promoted in the subject. In some embodiments, the spinal fusion occurs between two adjacent vertebrae. In other embodiments, the spinal fusion occurs between multiple vertebrae. In some other embodiments, administering abaloparatide improves bone health throughout the body to prevent other skeletal fractures. In specific embodiments, administering abaloparatide improves bone health to prevent fractures adjacent to the fused segment. In some embodiments, the subject undergoes a surgical procedure concurrently with the administration of the abaloparatide. In other embodiments, the subject undergoes a surgical procedure in at least the first three months after the initial administration of the abaloparatide. In specific embodiments, the subject is being pre-treated for at least 3 months with abaloparatide before surgical procedure. In certain embodiments where the subject undergoes a surgical procedure, the surgical procedure involves implantation in the subject a device selected from a group consisting of screws, spinal wires, artificial ligaments, vertebral cages, and artificial disks. In other embodiments, the subject undergoes a surgical procedure that uses transplanted bone or bone tissue (i.e. bone graft). In some embodiments of the method, the surgical procedure is an anterior or a posterior surgical procedure. In a specific embodiment, the surgical procedure is a posterior surgical procedure involving posterolateral fusion.

In yet another aspect, provided herein is a method for enhancing healing after spinal surgery, including administering to a subject having a spinal surgery, a therapeutically effective amount of abaloparatide, such that healing is promoted in the subject. In certain embodiments, the spinal surgery is performed to facilitate spinal fusion. In some embodiments, the spinal fusion occurs between two adjacent vertebrae. In other embodiments, spinal fusion occurs between multiple vertebrae. In some other embodiments, administering abaloparatide improves bone health throughout the body to prevent other skeletal fractures. In specific embodiments, administering abaloparatide improves bone health to prevent fractures adjacent to the fused segment. In some embodiments, the subject undergoes surgery concurrently with the administration of the abaloparatide. In other embodiments, the subject undergoes surgery in at least the first three months after the initial administration of the abaloparatide. In specific embodiments, the subject is being pre-treated for at least 3 months with abaloparatide before surgery. In certain embodiments, the surgery involves implantation in the subject a device selected from a group consisting of screws, spinal wires, artificial ligaments, vertebral cages, and artificial disks. In other embodiments, the subject undergoes a surgery that uses transplanted bone or bone tissue (i.e. bone graft). In some embodiments of the method, the surgery is an anterior or a posterior surgery. In a specific embodiment, the surgery is a posterior surgery involving posterolateral fusion.

In one embodiment, the spinal fracture is a thoracic fracture. In another embodiment, the spinal fracture is a lumbar fracture.

In some embodiments, administration includes daily subcutaneous administration of between 20-100 µg abaloparatide. In a particular embodiment, the administration is daily subcutaneous administration of 80 µg abaloparatide. In some other embodiments, administration includes daily transdermal administration of between 100-400 µg abaloparatide. In a particular embodiment, the administration is daily transdermal administration of 300 µg abaloparatide. In some embodiments, abaloparatide is administered daily for at least 2 months, at least 3 months, at least 4 months, at least 6 months, at least 12 months, or at least 18 months.

In some embodiments, bone formation is determined by measuring the levels of at least one bone formation marker. In some embodiments, the bone formation marker is osteocalcin. In some embodiments, enhanced spinal fusion is determined by a CT scan. In some embodiments, promotion of bone formation is determined by a CT scan.

In one aspect, provided herein is a method of treating a subject having a spinal fracture, the method comprising administering a therapeutically effective amount of abaloparatide to a subject having a spinal fracture. In some embodiments, the treatment comprises enhancing spinal fusion, bone formation, or both, without elevating bone resorption. In particular embodiments, enhanced spinal fusion is determined by a CT scan. In other particular embodiments, promotion of bone formation is determined by a CT scan. In some embodiments of the method, administering a therapeutically effective amount of abaloparatide to a subject having a spinal fracture enhances spinal fusion in the subject. In one embodiment, the spinal fusion occurs between two adjacent vertebrae. In other embodiment, the spinal fusion occurs between multiple vertebrae. In some other embodiments of the method, administering a therapeutically effective amount of abaloparatide to a subject having a spinal fracture promotes bone formation in the subject.

In one embodiment of the method of treating a subject having a spinal fracture, the method comprises administering a therapeutically effective amount of abaloparatide to the subject prior to a spinal surgery. In particular embodiments, administering the therapeutically effective amount of abaloparatide elevates bone formation markers without elevating bone resorption markers. In some embodiments, the bone formation marker is selected from a group consisting of Osteocalcin (OC), N-terminal propeptide of type I procollagen (PINP) and Bone-specific alkaline phosphatase (BAP). In a particular embodiment, the bone formation marker is Osteocalcin. In another particular embodiment, the bone formation marker is N-terminal propeptide of type I procollagen (PINP). In some embodiments, the bone resorption marker is selected from a group consisting of Tartrate-resistant acid phosphatase (TRAcP-B, 5b), Collagen-related markers Hydroxyproline (total and dialyzable, Hyp), Hydroxylysine-glycosides, Pyridinoline (PYD), Deoxypyridinoline (DPD), Carboxy terminal cross-linked telopeptide of type I collagen (ICTP, CTX-MMP), Bone Sialoprotein (BSP) and Cathepsins. In a particular embodiment, the bone formation marker is TRAcP-B. In another particular embodiment, the bone formation marker is TRAcP-5b. In some embodiments of the method provided herein, the spinal fracture is a thoracic fracture. In other embodiments of the method provided herein, the spinal fracture is a lumbar fracture.

In another aspect, provided herein is a method of treating a subject having a spinal surgery, the method comprising administering a therapeutically effective amount of abaloparatide to the subject prior to surgery, subsequent to surgery, or both. In some embodiments, administering the therapeutically effective amount of the abaloparatide is initiated prior to the spinal surgery. In one embodiment of the method wherein administering the therapeutically effective amount of the abaloparatide is initiated prior to the spinal surgery, the subject is pre-treated for at least 3 months with the abaloparatide before the spinal surgery. In other embodiments, the administration to the subject occurs after having the spinal surgery. In some embodiments of the methods described here, surgery involves implantation in the subject a device selected from a group consisting of screws, spinal wires, artificial ligaments, vertebral cages, and artificial disks. In other embodiments of the methods described here, surgery involves bone graft employing transplanted bone or bone tissue. In particular embodiments of the methods described here, surgery is an anterior or a posterior. In specific embodiments, the posterior surgery is a posterolateral fusion.

In one embodiment of the method of treating a subject having a spinal surgery, the treatment enhances spinal fusion in the subject. In one embodiment, the spinal fusion occurs between two adjacent vertebrae. In other embodiment, the spinal fusion occurs between multiple vertebrae. In some other embodiments of the method, administering a therapeutically effective amount of abaloparatide to a subject having a spinal fracture promotes bone formation in the subject.

In yet another aspect, provided herein is a method of pre-treating a subject prior to a spinal surgery, the method comprising administering a therapeutically effective amount of abaloparatide to the subject prior to a surgery that further comprises implantation of a device or a bone graft. In one embodiment, the administration of abaloparatide continues after having the spinal surgery. In some embodiments of the methods of pre-treating a subject prior to a spinal surgery, surgery involves implantation in the subject a device selected from a group consisting of screws, spinal wires, artificial ligaments, vertebral cages, and artificial disks. In other embodiments of the methods of pre-treating a subject prior to a spinal surgery, surgery involves bone graft employing transplanted bone or bone tissue. In one embodiment of the methods of pre-treating a subject prior to a spinal surgery, the administration is daily subcutaneous administration of 80 µg abaloparatide or daily transdermal administration of 300 µg abaloparatide.

In the embodiments of the methods described here, the administration is daily subcutaneous administration of between 20-100 µg abaloparatide. In other embodiments of the methods described here, the administration is daily transdermal administration of between 100-400 µg abaloparatide. In one embodiment, the administration is daily subcutaneous administration of 80 µg abaloparatide. In another embodiment, the administration is daily transdermal administration of 300 µg abaloparatide. In the embodiments of the methods described herein, abaloparatide is administered daily for at least 2 months, 3 months, 4 months, 6 months, 12 months or 18 months.

In specific embodiments, administering abaloparatide improves bone health to prevent fractures adjacent to the fused segment. In some embodiments, the subject undergoes a surgical procedure concurrently with the administration of the abaloparatide. In other embodiments, the subject undergoes a surgical procedure in at least the first three months after the initial administration of the abaloparatide. In specific embodiments, the subject is being pre-treated for at least 3 months with abaloparatide before surgical procedure. In certain embodiments where the subject undergoes a surgical procedure, the surgical procedure involves implantation in the subject a device selected from a group consisting of screws, spinal wires, artificial ligaments, vertebral cages, and artificial disks. In other embodiments, the subject undergoes a surgical procedure that uses transplanted bone or bone tissue (i.e. bone graft). In some embodiments of the method, the surgical procedure is an anterior or a posterior surgical procedure. In a specific embodiment, the surgical procedure is a posterior surgical procedure involving posterolateral fusion.

BRIEF DESCRIPTION OF THE DRAWINGS

(FIG. 3A) Day 14 serum osteocalcin versus day 14 trabecular number (Tb.N) by micro-CT. (FIG. 3B) Day 28 serum osteocalcin versus day 28 trabecular bone volume per tissue volume (BV/TV). R values represent both groups combined.

FIG. 5A shows fusion rate as determined by manual assessment and majority consensus, showing significantly higher rates of fusion when abaloparatide is administered (100%, 10/10) vs saline control (45%, 5/11). FIG. 5B shows radiographic analysis grades (0-5 for each side of fusion, scores summed for a final 0-10 score) showing a higher average score for abaloparatide-treated animals (8.4) vs control (6.9).

FIG. 6A and FIG. 6B show representative radiographs depicting the extent of spinal fusions in saline control and abaloparatide treated rabbit groups, respectively.

FIG. 7A shows significantly higher bone volume in abaloparatide treated rabbit group compared to the saline control group.

FIG. 7B shows a comparison of the bone volume in each of the 10 rabbits in the abaloparatide group and the 11 rabbits in the saline control group.

FIG. 8A and FIG. 8B show coronal and sagittal views, respectively, of the trabecular region of interest (ROI) in the caudal aspect of the more cranial of the two fused vertebrae. The trabecular region of interest began ⅛th of the vertebral body height superior to the distal end of the vertebrae and extended cranially 43 transverse slices (≈3 mm). The trabecular ROI is shown as solid within the transparent shell of the vertebrae.

FIGS. 9A-F show plots of trabecular results. Plots are mean±SD with the individual data points overlaid. The value at the top of each plot is the p-value of an un-paired, two-tailed t-test comparing the ABL and saline treated groups.

DETAILED DESCRIPTION OF THE INVENTION

Figure 1:
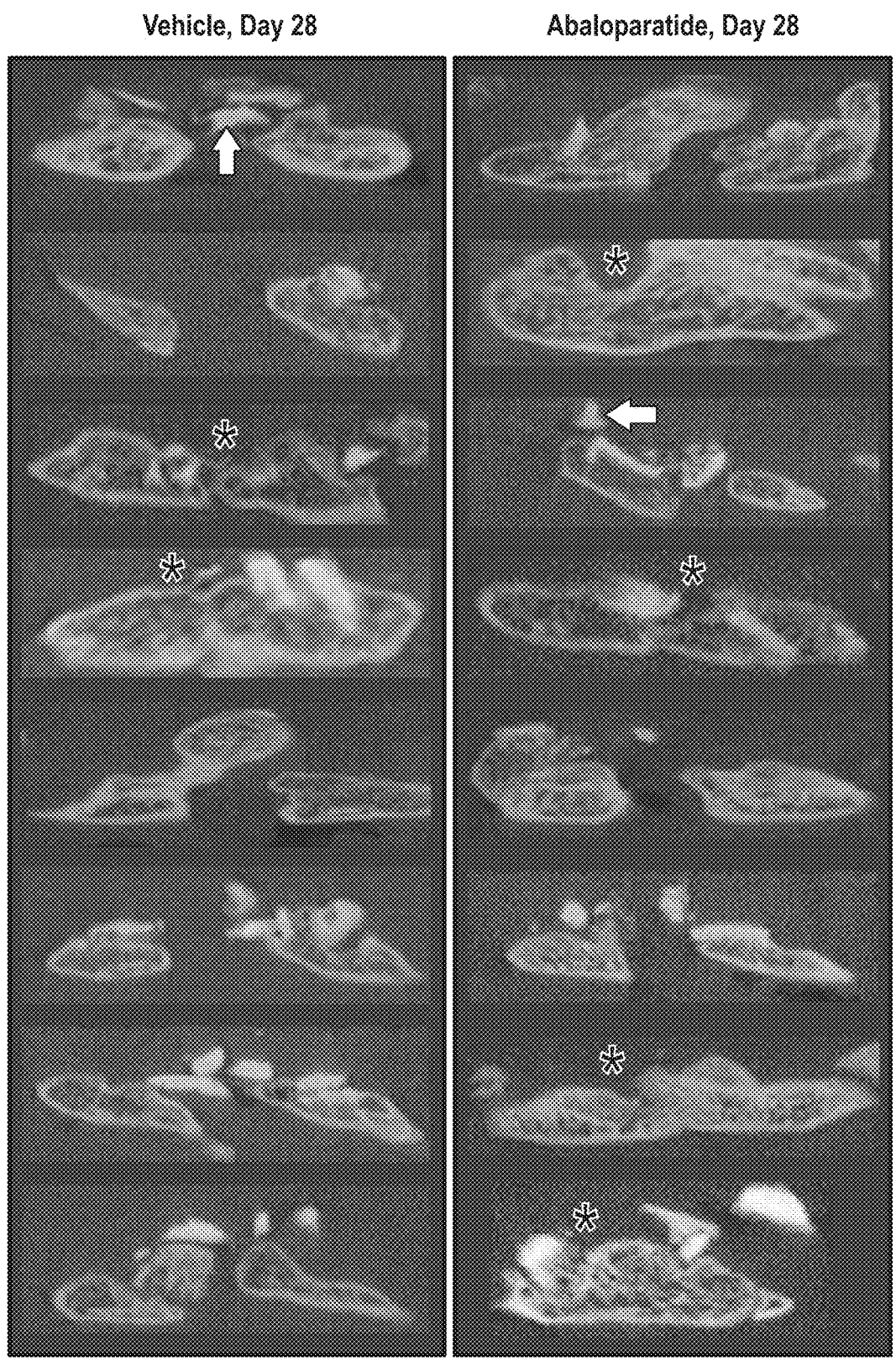
FIG. 1 shows 2D micro-CT images of L4-L5 transverse processes with interposed fusion masses comprising newly formed bone and bone autograft remnants. Images on the left and right are from animals that received daily injections of vehicle or abaloparatide 20 μg/kg/d, respectively, starting the day after surgery and continuing for 28 days. Asterisks indicate motion segments judged to be fused by radiographic and manual palpation assessments, which is corroborated visually in these micro-CT images. White arrows highlight residual bone autograft fragments, many of which are not incorporated into the established fusion masses.

The methods provided herein relate generally to enhancing spinal fusion, enhancing bone formation, and/or enhancing healing after spinal surgery in a subject having a spinal fracture, and specifically, to administering abaloparatide to a subject having a spinal fracture. In some embodiments, the methods provide for administering abaloparatide to a subject having a spinal surgery. Abaloparatide (ABL), as well as PTH (1-34), another activator of PTHR1, have been FDA approved for the treatment of women with postmenopausal osteoporosis at high risk for fracture.

As used herein, the terms "fused" or "fusion" mean having no detectable motion at the disc space in flexion and extension confirmed by two independent blinded observers.

As used herein, the terms "enhancing," "enhanced," "enhance," and the like, refer to intensifying, accelerating, or amplifying the quality, value, or extent of, e.g., spinal fusion, healing after spinal surgery, bone formation, and the like, relative to improvement without administration of abaloparatide according to the methods provided herein. For example, "enhanced spinal fusion" can refer to improving vertebral bone formation, density, strength, positive early effects on fusion mass architecture and/or elevated bone formation markers without increased bone resorption markers, relative to the measurement of the same features in an untreated subject. Bone formation markers, without limitations, can include one or more of Osteocalcin (OC), N-terminal propeptide of type I procollagen (PIMP) and Bone-specific alkaline phosphatase (BAP). Bone resorption markers, without limitations, can include one or more of Osteoclast Enzymes, Tartrate-resistant acid phosphatase (TRAcP-B 5b), Collagen-related markers Hydroxyproline (total and dialyzable, Hyp), Hydroxylysine-glycosides, (PYD), Deoxypyridinoline (DPD), Carboxy terminal cross-linked telopeptide of type I collagen (ICTP, CTX-MMP), Bone Sialoprotein (BSP) and Cathepsins (e.g. K, L). For example, "enhanced healing" can refer to faster healing times of the fractured bone in a subject treated with abaloparatide compared to the healing times in an untreated subject As used herein, the terms "promoting," "promoted," "promotes" and the like, refers to treatment that acts as a promoter or catalyst to, e.g., bone formation, healing after spinal surgery, and spinal fusion.

PTHrP is a protein with homology to PTH at the amino-terminus that binds to the same G-protein coupled receptor. Despite a common receptor (PTHR1), PTH primarily acts as an endocrine regulator of calcium homeostasis, whereas PTHrP plays a fundamental paracrine role in many organs including in the mediation of endochondral bone development. The differential effects of these proteins may be related not only to differential tissue expression, but also to distinct receptor binding properties. Human PTHrP (1-34) (hPTHrP) has a native sequence of:
Ala Val Ser Glu His Gln Leu Leu His Asp Lys Gly Lys Ser Ile Gln Asp Leu Arg Arg Arg Phe Phe Leu His His Leu Ile Ala Glu Ile His Thr Ala (SEQ ID NO:1).

Abaloparatide is a synthetic PTHrP analogue PTH1R agonist with 76% amino acid homology to hPTHrP (1-34) and having the amino sequence: Ala Val Ser Glu His Gln Leu Leu His Asp Lys Gly Lys Ser Ile Gln Asp Leu Arg Arg Arg Glu Leu Leu Glu Lys Leu Leu Aib Lys Leu His Thr Ala-NH$_2$ (SEQ ID NO: 2)

Abaloparatide has a potent anabolic activity with limited bone resorption, less calcium-mobilizing potential, and improved room temperature stability.

Previous femoral fracture study demonstrated enhanced callus bridging and improved strength in Abaloparatide-treated rats compared with vehicle controls (B. Lanske, et al. J Orthop Res 37 (2019) 812-820). Callus bridging and bone strength are parameters associated with chondrogenic and osteogenic endpoints that may also be relevant for spinal fusion (B. Lanske, et al. J Orthop Res 37 (2019) 812-820; S. D. Boden, et al. Spine (Phila Pa. 1976) 20 (1995) 412-20.D).

One aspect of the present disclosure relates to a method of enhancing spinal fusion, including administering to a subject having a spinal fracture, a therapeutically effective amount of abaloparatide, such that spinal fusion is enhanced in the subject. In one embodiment, enhanced spinal fusion is determined by a CT scan.

Another aspect of the present disclosure relates to is a method of promoting bone formation, including administering to a subject having a spinal fracture, a therapeutically effective amount of abaloparatide, such that bone formation is promoted in the subject. In one embodiment, bone formation is determined by measuring the levels of at least one bone formation marker. In some embodiments, the bone formation marker is osteocalcin. In other embodiments, the bone formation marker is P1NP. In one embodiment, promotion of bone formation is determined by a CT scan.

Yet another aspect of the present disclosure relates to a method for enhancing healing after spinal surgery, including administering to a subject having a spinal surgery, a therapeutically effective amount of abaloparatide, such that healing is promoted in the subject.

Exemplary spinal fractures include, without limitation, Compression, Burst, Flexion-distraction, and Fracture-dislocation. The fractures described herein can result from excessive physical force, collisions, infections, acquired conditions (i.e., pathological fractures), genetic conditions, or trauma (i.e., traumatic fractures). In some embodiments of the methods described herein, spine fusion procedures include deformities of the spine, spinal cord injury, spinal weakness or instability or herniated intervertebral discs. In one embodiment, the spinal fracture is a thoracic fracture. In another embodiment, the spinal fracture is a lumbar fracture. In some embodiments, the subjects with spinal fractures have been diagnosed or treated for other bone related diseases such as osteoporosis, rheumatoid arthritis, and the like. In some embodiments, the subjects with spinal fractures have not been diagnosed or treated for other bone related diseases such as osteoporosis. In some embodiments, the subject has osteoporosis. In some embodiments, the subject does not have osteoporosis.

Spinal fusion may be performed for any of a number of reasons. It is frequently used in treatment of a fractured vertebra. In specific cases of spinal fractures, a vertebra may slip forward on top of one another and cause a fracture. This condition may be treated by fusion surgery. Fusion surgery is a prescribed treatment for actual or potential instability in spinal vertebrae, typically caused by abnormal or excessive motion between two or more vertebrae. Cervical disc herniations requiring surgery often call for fusion as well as removal of the herniated disc (discectomy). Some spinal fractures, including those associated with spinal cord or nerve injury, generally require fusion as part of the surgical treatment. Spinal fusion may also be used to correct certain types of spinal deformity such as scoliosis.

Depending upon the clinical situation, spinal fusions can be performed either at a single level (fusing two adjacent vertebrae) or at multiple levels (fusing multiple vertebra—usually grouped together). The systemic therapy of administering abaloparatide described in the methods provided herein can be used for the single and/or multilevel fusions. The rabbit spinal fusion study data provided in Example 3 shows that a systemic approach works for multi-level fusions. The data show that administration of abaloparatide also strengthens the area adjacent to the fusion. The systemic treatment, as described in the methods herein, also improves bone health throughout the body to prevent other skeletal fractures, or more importantly fractures adjacent to the fused segment. The adjacent segments are often prone to fracture due to the rigidity of the fused area. In some embodiments, the methods described herein are provided for enhancing spinal fusion, enhancing bone formation and/or enhancing healing after spinal surgery wherein the spinal fusions are between adjacent vertebrae. In specific embodiments, the methods described herein are provided for enhancing spinal fusion, enhancing bone formation and/or enhancing healing after spinal surgery wherein the spinal fusion occurs between two adjacent vertebrae (i.e., single level fusions). In other embodiments, the methods described herein are provided for enhancing spinal fusion, enhancing bone formation and/or enhancing healing after spinal surgery wherein the spinal fusion occurs between three or more vertebrae (i.e., multiple level fusions).

The methods described herein with the systemic administration of abaloparatide can be combined with various anterior and posterior surgical procedures and a wide range of devices, including screws, spinal wires, artificial ligaments, vertebral cages, and artificial disks. Spinal fusion surgery is commonly performed in patients who require decompression for nerve root pain and whose symptoms are largely discogenic. A posterior surgical approach is used when posterior decompression is required in addition to fusion. Fusion is performed by using an anterior surgical approach when pain is predominantly discogenic and posterior decompression is not required. In some embodiments, the methods described herein are used in combination with a posterior or transforaminal interbody fusion approach, such as a posterior lumbar interbody fusion (PLIF) or transforaminal lumbar interbody fusion (TLIF) approach. In particular embodiments, the PLIF and/or TLIF surgical procedures involve placing bone fragments or other conventional inter-body spacers (e.g., ramps or cages made of titanium or polyetheretherketone) and into the space between the vertebral bones to enhance fusion. In other embodiments, the methods described herein are used in combination with a posterior or transforaminal interbody fusion approach, such as an anterior lumbar interbody fusion (ALIF) approach. In some embodiments of the method, the surgical procedure is performed concurrently with the administration of abaloparatide. In some other embodiments of the method, the surgical procedure is performed in at least the first three months after the initial administration of the abaloparatide.

In some embodiments, the methods described herein with the systemic administration of abaloparatide can be combined with surgical procedures using a wide range of devices, including screws, spinal wires, artificial ligaments, vertebral cages, and artificial disks. Additionally, a wide variety of different implants or spacers can be used in the methods described herein. Examples of suitable implants may be found in U.S. Pat. Nos. 4,961,740; 5,015,247; 5,423,817, PCT Applications No. PCT/US01/08193 and PCT/US01/08073, and published PCT Application WO 99/29271, the entirety of which are incorporated herein by reference. In some embodiments, the systemic administration of the abaloparatide described in the methods provided herein can be combined with the surgical procedure where a rigid internal fixation of a spinal instrumentation is implanted into a subject having a spinal fracture such that the combination enhances spinal fusion, enhances bone formation and/or enhances healing after spinal surgery. In specific embodiments, the spinal instrumentation is selected from a group consisting of screws, spinal wires, artificial ligaments, vertebral cages, and artificial disks. In other embodiments, the systemic administration of the abaloparatide described in the methods provided herein can be combined with the surgical procedure where bone fragments are placed into the space between the bones in a subject having a spinal fracture. In these embodiments, the placement of bone fragments enhances spinal fusion, enhances bone formation and/or enhances healing after spinal surgery.

In certain embodiments of the methods described herein, abaloparatide is administered to a subject prior to the spinal fusion surgery. In embodiments where systemic administration of abaloparatide is combined with surgical techniques, administration of abaloparatide prior to the spinal fusion surgery can strengthen the vertebral to receive surgical hardware, at the time of the surgery or following surgery. In other embodiments of the methods described herein, abaloparatide is administered to a subject after the spinal fusion surgery. In such embodiments, administration of abaloparatide post spinal fusion surgery can enhance spinal fusion, enhance bone formation and/or enhance healing after spinal surgery.

In some embodiments, the abaloparatide is delivered in a transdermal device. In some embodiments, the transdermal device is a device and a formulation as disclosed in WO2017/062922, published 13 Apr. 2017, WO2017/184355 published 26 Oct. 2017, WO2017/062727 published 13 Apr. 2017, WO2017/184355 published 26 Oct. 2017 and filed as PCT/US2017/026462 on 6 Apr. 2017 and U.S. patent application Ser. No. 16/297,280, filed Mar. 8, 2019. These transdermal devices can be deployed with a single-use applicator or an application capable of being used multiple times. In some embodiments, the abaloparatide formulation includes Zn2+ salts (ZnCl2). In some embodiments, the transdermal device is a transdermal patch that delivers at least 100 μg, at least 150 μg, at least 200 μg, at least 250 μg, at least 300 μg, at least 350 μg or at least 400 μg abaloparatide, and the patch is administered daily. In particular embodiments, the transdermal patch delivers 300 μg abaloparatide, and the patch is administered daily. In some embodiments, the transdermal device is a subcutaneous injection that delivers at least 20 μg, at least 30 μg, at least 40 μg, at least 50 μg, at least 60 μg, at least 70 μg, at least 80 μg, at least 90 μg, or at least 100 μg abaloparatide daily. In specific embodiments, the transdermal device is a subcutaneous injection that delivers 80 μg abaloparatide daily. In some embodiments, the device and formulation is that employed for the currently approved TYMLOS abaloparatide injection product.

In some embodiments, abaloparatide is administered daily for at least 2 months, at least 3 months, at least 4 months, at least 6 months, at least 12 months, or at least 18 months. In other embodiments, abaloparatide is administered daily for a suitable time frame for the spinal fracture to heal. Examples of a suitable time frame for a spinal fracture treatment include, without limitation, 2 weeks, 4 weeks, 6 weeks, 8 weeks, 12 weeks, 3 months, 24 weeks, 6 months, 48 weeks, 12 months, 18 months, and 24 months. In some embodiments, a suitable time frame for a spinal fracture treatment includes a period of at least 6 months, at least 3 years, at least 4 years, or at least 5 years.

The methods described here provide improved outcomes for subjects with spinal fracture or subjects that undergo spinal surgery. In some embodiments, the methods provide enhanced healing compared to the healing in untreated subjects. In specific embodiments, the methods provide enhanced healing in subjects having spinal surgery compared to the healing in untreated subjects having spinal surgery. In certain embodiments, the enhanced healing decreases the time taken for spinal fracture healing, with or without surgery. In some embodiments, the healing time in a subject treated with abaloparatide is decreased by at least 10%, at least 20%, at least 30%, at least 40%, or at least 50%, compared to the healing time in an untreated subject of the same age group, undergoing a similar spinal surgical procedure and having the same type of spinal fracture. In some embodiments, the healing time in a subject treated with abaloparatide is decreased by at least 2 weeks, 4 weeks, 6 weeks, 8 weeks, 3 months, 6 months, a year or 18 months, compared to the healing time in an untreated subject of the same age group, undergoing a similar spinal surgical procedure and having the same type of fracture. In some embodiments, degree of decrease in fracture healing time in subjects treated with abaloparatide compared to the untreated subjects, correlates with their age. For example, the highest decrease in fracture healing time may be observed in the oldest subjects treated with abaloparatide. In certain embodiments, the percentage decrease in fracture healing time is higher in older subjects. In some embodiments, the percentage decrease in healing time in older subjects is higher by at least 10%, at least 20%, at least 30%, at least 40%, or at least 50%, compared to the percentage decrease in healing time in younger subjects having the same type of fracture.

Fracture healing times in general, and spinal fracture healing times in particular, will vary based on a variety of factors, including but not limited to, the type of fracture (e.g. simple versus compound fracture), site of fracture (e.g., long bone fracture, pelvic fracture) and the physiological condition of the subject (e.g., age, body weight, medical history, general physical condition, and the presence of other medical conditions). These times can vary depending on age, health (healthy, osteoporotic, etc.), and the type spinal (e.g., lumbar, thoracic) fracture. For example, a healthy individual with a spinal fracture will heal faster than an individual in the same age group but having a condition that weakens bones (e.g., osteoporosis). One skilled in the clinical art (e.g., a physician) will be able to determine the time for fracture healing and vary the treatment period, as needed.

The examples illustrate that abaloparatide enhances spinal fusion in a rat posterolateral model (PLF) and in a Rabbit Spinal Arthrodesis Model. As described in the examples herein, and shown in the figures, abaloparatide-treated (ABL-treated) rats exhibited an increase in vertebral bone formation, density, and strength, and also improves long bone fracture healing. with vehicle controls. Systemic abaloparatide administration was associated with positive early effects on fusion mass architecture in rats undergoing noninstrumented PLF, in association with elevated bone formation markers without increased bone resorption markers.

Abaloparatide has high homology to PTH-related protein (PTHrP), an endogenous factor that plays important roles in osteogenesis, chondrogenesis, and fracture healing. Abaloparatide has high homology to PTH-related protein (PTHrP), an endogenous factor that plays important roles in osteogenesis, chondrogenesis, and fracture healing. A previous rat PLF study showed that local administration of another PTHrP analog in a controlled release carrier increased fusion mass BMD and bone volume, with more animals achieving solid fusions compared with empty carrier controls. The rat PLF study described herein shows that systemic abaloparatide therapy was associated with increased bone formation markers, improvements in fusion mass microarchitecture, and a 2-fold higher incidence of fusion at day 28 compared with vehicle controls. Fusion status was assessed on days 14 and 28 based on data from a similar rat PLF model indicating that those time points reflect the transition from an unfused to a fused state. Radiography and manual palpation showed no solid fusions in the vehicle or abaloparatide group at day 14, similar to findings from a rat PLF model evaluating teriparatide. At day 28, 25% and 16 50% of the vehicle and abaloparatide animals (respectively) demonstrated fusion by both assessment approaches.

Abaloparatide increased serum levels of the bone formation marker osteocalcin compared with vehicle controls. Regression analyses indicated that serum osteocalcin was associated with fusion mass microarchitectural parameters, suggesting the osteoblast-stimulating effects of abaloparatide may influence fusion processes. The lack of increased serum TRACP-5b in the abaloparatide group is consistent with the lack of increased systemic and tissue-level parameters of bone resorption with abaloparatide in animal models of osteoporosis. A study in male mice showed that abaloparatide and teriparatide both increased bone resorption markers at 4-fold the current dose, whereas bone formation markers were significantly higher with high-dose abaloparatide versus high-dose teriparatide Pharmacodynamic profile of increased bone formation with minimal effects on bone resorption may be desirable in patients undergoing spinal fusion, as inadequate anabolism and premature catabolism of fusion masses are potential contributors to pseudoarthrosis. The confluence of low bone formation markers and high serum TRACP-5b were the most significant risk factors for nonunion in patients undergoing lumbar spinal fusion surgery. Aberrant local stimulation of bone resorption can also occur with BMP-2, which may be associated with untoward effects in patients undergoing spinal fusion surgery. Animal data indicate that BMP-2 promotes better bony bridging when its osteoclast-stimulating effects are inhibited.

The data provided in Example 1 includes excellent inter-observer and inter-modality concordance in fusion assessments. It is also notable that positive effects were achieved with a relatively modest abaloparatide dose, one that represents a substantially lower multiple of its approved clinical dose compared with doses of teriparatide used in most rat spinal fusion studies. Abaloparatide increases vertebral BMD and promotes fracture bridging and callus strength in rats when dosed as low as 5 µg/kg/d.

The data provided in Example 2 shows that an acceptable rate of spinal fusion was achieved in all Spinal Arthrodesis Model rabbits, with a control group success rate of 45% (5/11). In all metrics investigated, better outcomes of spinal fusion surgery were observed in the group of rabbits given abaloparatide. A statistically significantly higher number of spines were determined (via MAF) to be acceptably fused. Larger and stronger fusion masses were also identified in abaloparatide-treated rabbits. Abaloparatide is successful at improving results of spinal fusion surgery in a large animal model (rabbits).

The following examples are provided to better illustrate the claimed methods and are not to be interpreted as limiting the scope of the methods provided herein. To the extent that specific materials are mentioned, it is merely for purposes of illustration and is not intended to limit the disclosure. One skilled in the art may develop equivalent means or reactants without the exercise of inventive capacity and without departing from the scope of the disclosure. It will be understood that many variations can be made in the procedures herein described while still remaining within the bounds of the present disclosure. It is the intention of the inventors that such variations are included within the scope of the disclosure.

EXEMPLIFICATION

Example 1: Abaloparatide Enhances Spinal Fusion in a Rat Posterolateral Fusion Model Provided herein are data demonstrating that abaloparatide enhances spinal fusion in a rat posterolateral model (PLF) and in a Rabbit Spinal Arthrodesis Model. Efficacy of ABL in spinal fusion was studied due to the positive effects of PTHR1 activation on spinal fusion observed in some studies and the potentially favorable overall pharmacodynamic profile of ABL of increased bone formation with minimal increase in bone resorption. ABL administration exerts positive early effects on fusion mass architecture in rats undergoing non-instrumented PLF.

The objective of this study was to evaluate the in vivo performance of daily injections of ABL20 (20 µg/kg) compared to saline control in an established posterolateral fusion rat model. Thirty-two 10-wk old male rats underwent posterolateral spinal surgery. A dorsal midline skin incision was made from L1 to the sacrum, then the fascia and muscle were incised over the transverse processes (TPs). The medial ⅓ to ½ of the TPs were decorticated with a high-speed burr. Approximately 0.5 cc of cortico-cancellous bone graft from spinous processes and the iliac crest were obtained bilaterally and placed in the paraspinal bed between the transverse processes.

Starting at day-1 post-OP, rats were either injected with ABL20 or saline for 14 and 28 days. Radiographic analyses and manual palpitations were performed at day 14 and 28 to examine potential fusion at grafted sites. No fusion was observed by day 14 which was also confirmed by µCT analyses. At day 28, 50% of the ABL20 treated, but only 25% of saline treated rats had a mechanical fusion rate by manual palpitation and autoradiography. Moreover, µCT analysis at the grafted site showed a significantly greater total bone volume in ABL20 treated rats versus saline injected rats (p=0.0126). Trabecular number and thickness were also significantly greater than saline controls at 28 days (p=0.0436 and p=0.0194 respectively). Serum samples were collected at all timepoints and are currently being used to determine bone turn over marker such as P1NP, Trap-5c, Rankl, and Opg.

Animal Care and Surgery. All animal procedures and activities were approved by the University of Iowa's Institutional Animal Care and Use Committee (IACUC) and performed in an AAALAC-accredited vivarium at the Bone Healing Research Lab and Iowa Spine Research Lab (Iowa City, Iowa, USA). Thirty-two 8-week-old male Sprague-Dawley rats were obtained from Covance and pair-housed in standard Thorne racks. Animals were ear-tagged and micro-chipped and underwent physical examinations and daily cage-side observation over a 7-day acclimation period. Animals were weighed before surgery and weekly thereafter. Antibiotic (Enroflaxacin 5 mg/kg) was administered intramuscularly prior to surgery. Serum was prepared from saphenous vein blood obtained prior to surgery (Day 0) and 14 and 28 days postoperatively. Preoperatively, animals were anesthetized with isoflurane and fur was removed over the dorsal surgical region. Exposed skin was scrubbed with chlorhexidine soap and wiped with isopropyl alcohol, and chlorhexidine was applied prior to creating a dorsal ~5 cm-long mid-line incision from L1 to the sacrum. Fascia and muscles were incised over the L1-L6 transverse processes, and the medial third-to-half of L4 and L5 transverse processes were decorticated with a high-speed burr. To obtain bone autograft, bupivacaine (1 mg, 0.25%, 0.1 mL per site) was applied to the fascia above the iliac crest followed by incision and harvesting of ~0.4 cc of cortico-cancellous bone graft from each iliac crest. This graft was combined with bone harvested from L4-L5 spinous processes for a total of ~1.0 cc of autograft per animal. Autograft was morselized with a rongeur and ~0.5 cc was applied to each of the left and right L4-L5 paraspinal beds between their transverse processes. Autograft was placed along the medial third-to-half of the transverse processes, primarily toward the midline, with no direct contact with vertebral bodies. Fascia and skin were closed with 4-0 Vicryl sutures and the skin stapled closed. Postoperative analgesics were administered per IACUC protocol, and animals were allowed free cage movement. All animals were closely observed twice per day over the subsequent 4 weeks and given additional pain medication as indicated by mobility, diet, disposition, and general activity.

Starting 1 day postoperatively, rats received daily subcutaneous injections of sterile saline (vehicle, n=16) or abaloparatide at 20 µg/kg/d (n=16), with abaloparatide doses adjusted weekly based on body weight. Eight animals from each treatment group were euthanized 14 days after surgery and the remaining animals were euthanized 28 days after surgery with Euthasol (120 mg/kg i.v.). Necropsies included examination of all external surfaces, orifices, cranial, thoracic, abdominal, and pelvic cavities including contents. The entire lumbar column was removed en bloc and soft tissues were removed from the surgically-treated spinal unit. The grafted site was examined for graft migration, infection, and soft tissue abnormalities.

Radiography. Anesthetized rats were radiographed dorsoventrally 2 and 4 weeks postoperatively using a Quantum DR Digital X-ray unit and Carestream Image software (Crestream Health, Inc., Rochester, NY, USA). Three blinded reviewers evaluated fusion qualitatively (fused or unfused) on each of the left and right sides of the motion segment, with fusion defined as the presence of continuous bridging bone spanning the L4 and L5 transverse processes. The plain films were also assessed qualitatively for graft migration, osteolysis, fracture, and other adverse events.

Manual palpation for fusion status. Stiffness of the fused motion segment was assessed by manual palpation according to accepted practice, as defined in Fredricks et al., 2016. Comparison of two synthetic bone graft products in a rabbit posterolateral fusion model. Iowa Orthop J 36:167-173, the entire contents of which has been incorporated herein in its entirety. Two independent observers blinded to treatment allocation graded motion segments as fused if there was no detectable motion at the disc space in flexion or extension, and unfused if motion was detected.

Micro-computed tomography (micro-CT) analyses. The excised lumbar spine was scanned with a SkyScan 1176 Micro-CT unit. Thresholding was performed manually based on the visualization of host cancellous bone. A region of interest comprising the entire fusion mass including transverse processes was used to calculate total bone volume (BV), trabecular number (Tb.N), and trabecular thickness (Tb.Th) for the left and right sides of each grafted site, results of which were averaged Bone formation/turnover markers. Serum concentrations of the bone formation marker osteocalcin were determined by the Immutopics Rat Osteocalcin ELISA Kit (Quidel). Serum concentrations of the bone resorption marker tartrate-resistant acid phosphatase isoform 5b (TRACP-5b) were measured with the RatTRAP ELISA (IDS).

Statistical analyses. Results are expressed as group means and standard error. Bone turnover marker and micro-CT results were analyzed using multiple two-tailed t-tests assuming unequal variance. Holm-Sidak method was used to correct for multiple comparisons, with an adjusted P value of <0.05 indicating statistical significance. All statistical analyses including linear regressions were performed using GraphPad Prism V8.1.1 (GraphPad Software Inc., San Diego, CA, USA).

Analysis of Bone formation/turnover markers: All animals in the day 28 groups survived in good health until scheduled necropsy. Two animals from the day 14 vehicle group and one from the day 14 abaloparatide group were euthanized 1-2 days after surgery due to graft harvesting complications, leaving an n of 6 and 7 animals in the day 14 vehicle and abaloparatide groups, respectively. Rats were alert and eating within 3 hours of surgery, and there were no complications related to abaloparatide administration, including no effect on body weight. All necropsies were unremarkable, with no adverse changes such as inflamed, necrotic, or devascularized tissue surrounding the grafted levels.

The bone formation marker serum osteocalcin was significantly higher in the abaloparatide versus vehicle groups at days 14 and 28 (Table 1). The bone resorption marker serum TRACP-was similar in abaloparatide and vehicle groups at days 14 and 28, and the data is provided in Table 1 for the biochemical markers of bone formation (serum osteocalcin) and bone resorption (serum TRACP-5b). The data represent means±standard errors, n=14-15 per group for Days 0 and 3 14, and 8 per group for Day 28. *P<0.005 vs vehicle control.

TABLE 1

Biochemical markers of bone formation and bone resorption

|  | Vehicle | Abaloparatide |
|---|---|---|
| Serum Osteocalcin (ng/mL) | | |
| Day 0 | 44.2 ± 1.9 | 44.2 ± 2.2 |
| Day 14 | 34.3 ± 1.5 | 45.4 ± 1.4* |
| Day 28 | 24.7 ± 1.0 | 35.7 ± 2.1* |
| Serum TRACP-5b (U/L) | | |
| Day 0 | 5.91 ± 0.31 | 5.9 ± 0.32 |
| Day 14 | 6.64 ± 0.54 | 5.47 ± 0.38 |
| Day 28 | 5.25 ± 0.29 | 5.62 ± 39 |

Micro-CT Analysis of fusion masses. 3D micro-CT assessment of fusion masses indicated similar bone volume (BV) in the two 2 treatment groups at day 14. At day 28, the abaloparatide group showed a trend toward greater BV versus vehicle (multiplicity-adjusted p=0.109; Table 2). Trabecular number was significantly higher in the abaloparatide group versus vehicle controls at day 14 (adjusted p=5 0.002), with a trend to higher Tb.N at day 28 (adjusted p=0.081). Trabecular thickness also showed a trend to higher values in the abaloparatide group versus vehicle controls at day 28 (adjusted p=0.095, Table 2). The data are based on average values for left and right sides. Data represent means±standard error; n=6-7/group for Veh and 7-8/group for abaloparatide. *P<0.05 vs vehicle control.

TABLE 2

Micro-CT data for fusion masses

|  | Vehicle | Abaloparatide |
|---|---|---|
| Bone volume (mm³) | | |
| Day 14 | 58.3 ± 2.3 | 59.5 ± 3.0 |
| Day 28 | 51.7 ± 2.5 | 61.4 ± 3.1 |
| Trabecular Number (1/mm) | | |
| Day 14 | 7.78 ± 0.21 | 11.09 ± 0.68* |
| Day 28 | 8.38 ± 0.27 | 9.87 ± 0.74 |
| Trabecular Thickness (mm) | | |
| Day 14 | 50.3 ± 0.8 | 50.3 ± 1.7 |
| Day 28 | 50.2 ± 1.6 | 55.0 ± 1.6 |

Figure 2:
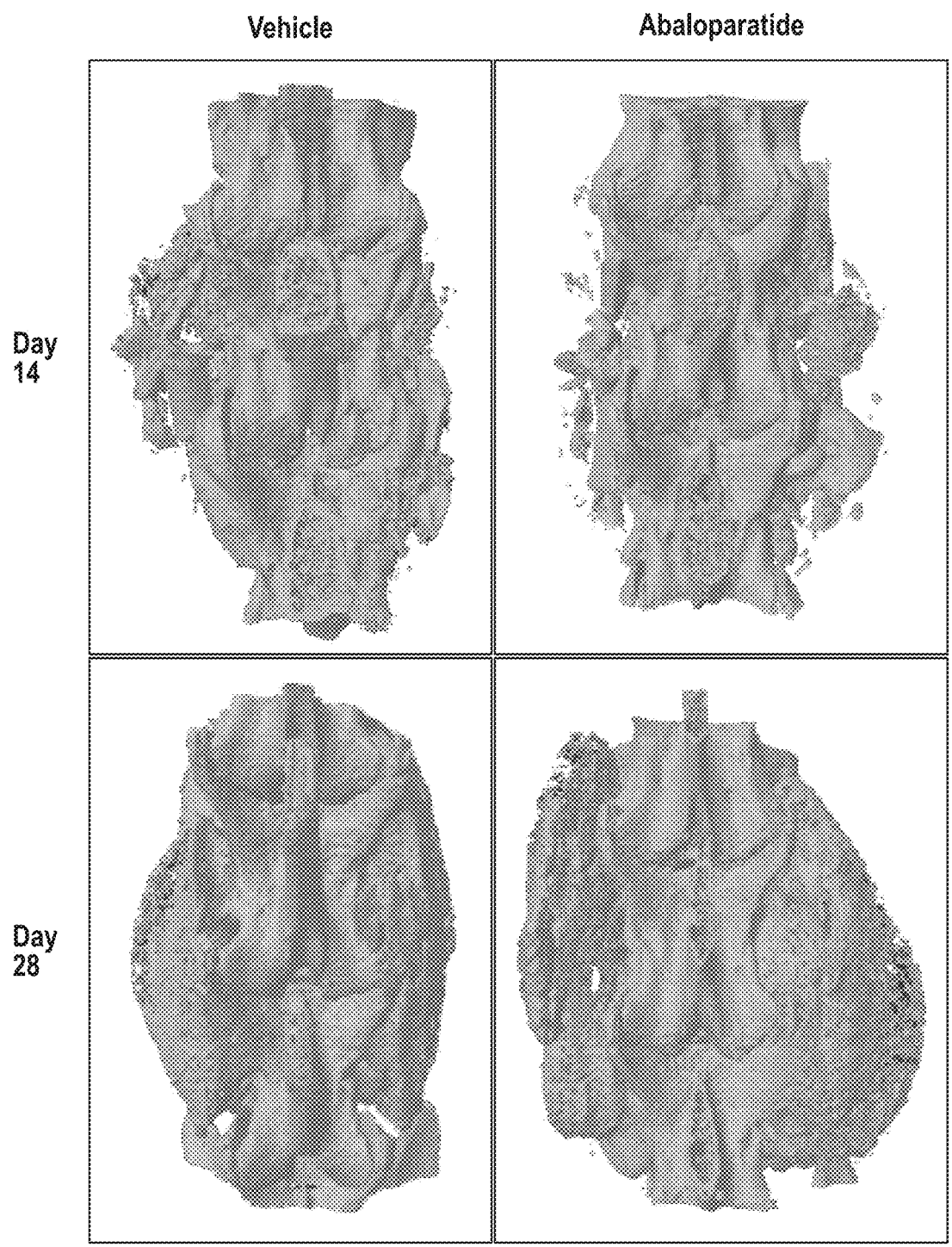
FIG. 2 shows 3D micro-CT images of motion segments showing lack of fusion in representative animals from both treatment groups at day 14 and successful fusion in each treatment group at day 28. The day 14 examples were selected based on fusion mass bone volume that was closest to their group mean, whereas fusion mass bone volumes for the day 28 examples were closest to their group mean among the subset of animals deemed fused by radiographic and manual palpation assessments.

Parasagittal 2D micro-CT reconstructions of fusion masses were also generated across the transverse processes spanning the motion segment for unblinded visual evaluation of fusion masses. FIG. 1 shows reconstructions for the right side of all day 28 animals. Successful fusion is visually evident in 2 of 8 vehicle controls based on the continuous presence of mineralized bone between the grafted transverse processes. Most of the vehicle control samples show residual autograft particles in the form of dense white bone fragments that are largely unincorporated into the fusion mass. Fusion is evident by micro-CT in 4 of the 8 animals in the abaloparatide group, with several cases showing residual graft particles (FIG. 1). FIG. 2 provides 3D reconstructed micro-CT images from representative unfused motion segments at day 14, and successfully fused segments at day 28. The larger fusion mass in the abaloparatide versus vehicle sample at day 28 is consistent with the 19% greater average fusion mass bone volume in the abaloparatide versus vehicle group at that time point.

Figure 3A:
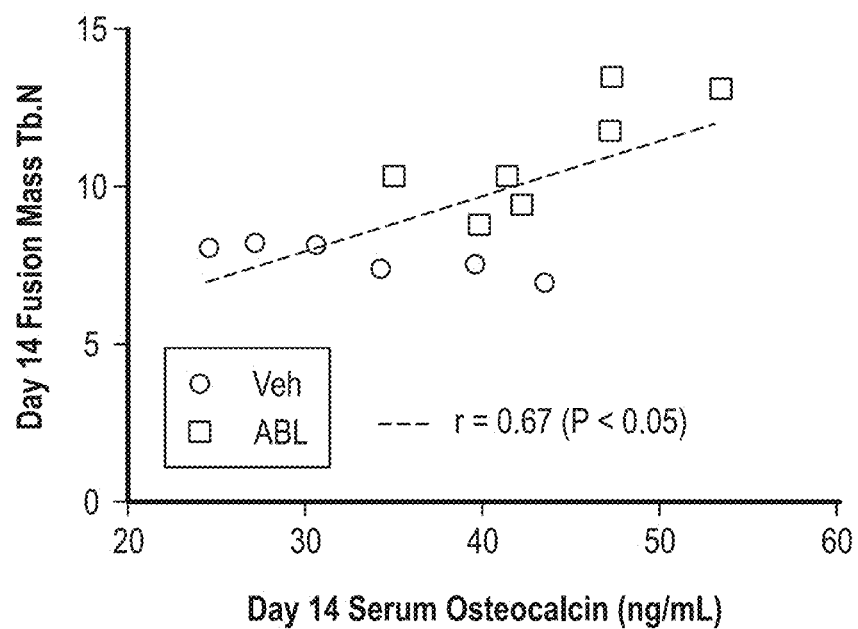
FIGS. 3A-B show linear regressions of serum osteocalcin versus fusion mass bone microarchitecture.
Figure 3B:
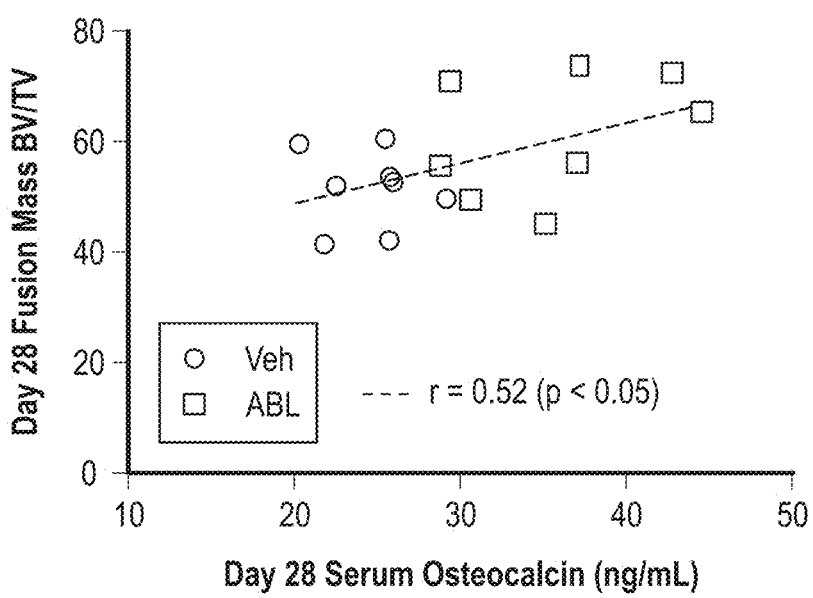

Observations of higher trabecular number and higher serum osteocalcin with abaloparatide versus vehicle led to explorations of serum osteocalcin as a determinant of microarchitectural parameters. Linear regressions revealed that day 14 serum osteocalcin was significantly and positively correlated with day 14 trabecular number, with an overall Pearson r value of 0.67 (p<2 0.05; FIG. 3). Day 28 osteocalcin correlated positively with day 28 trabecular number (r=0.55, p 3<0.05; data not shown), as did osteocalcin versus trabecular number for both time points combined (r=0.59, p<0.001; data not shown). Day 28 serum osteocalcin also correlated positively with day 28 bone volume (r=0.52, p<0.05; FIG. 3), and day 14 osteocalcin correlated with day 28 trabecular thickness (r=0.54, p<0.05; data not shown). Serum TRACP-5b was not associated with bone volume, trabecular number, or trabecular thickness.

Figure 4A:
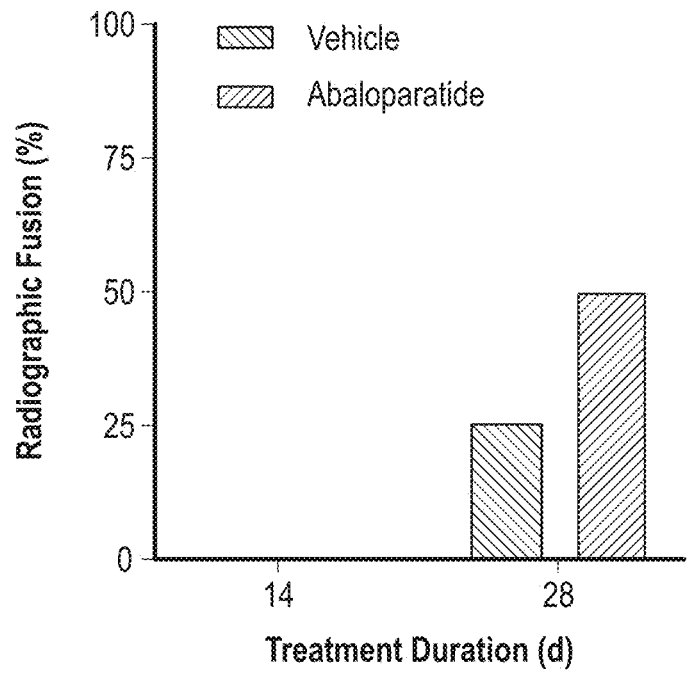
FIGS. 4A-C fusion status assessed by radiography (FIG. 4A) and manual palpation (FIG. 4B) indicated no fusions in either group at day 14, whereas both assessments indicated successful fusion in 2 of 8 vehicle control group animals and 4 of 8 abaloparatide group animals at day 28. Lumbar spine radiographs (FIG. 4C) show representative unfused examples at day 14, and fused examples at day 28. Day 14 examples were selected based on fusion mass bone volume closest to their group mean, whereas fusion mass bone volumes for the day 28 examples were closest to their group mean among the subset of animals deemed fused by radiography and manual palpation. White brackets identify motion segments and associated fusion masses.
Figure 4B:
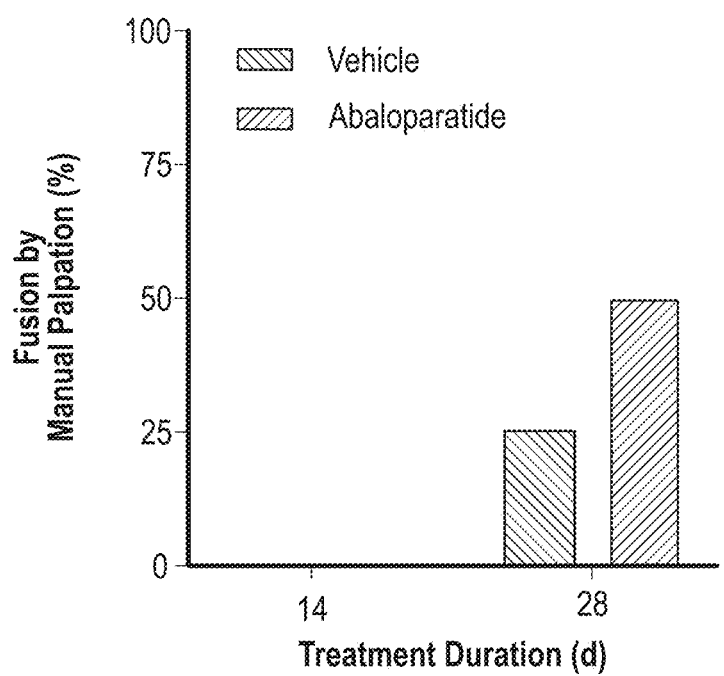
Figure 4C:
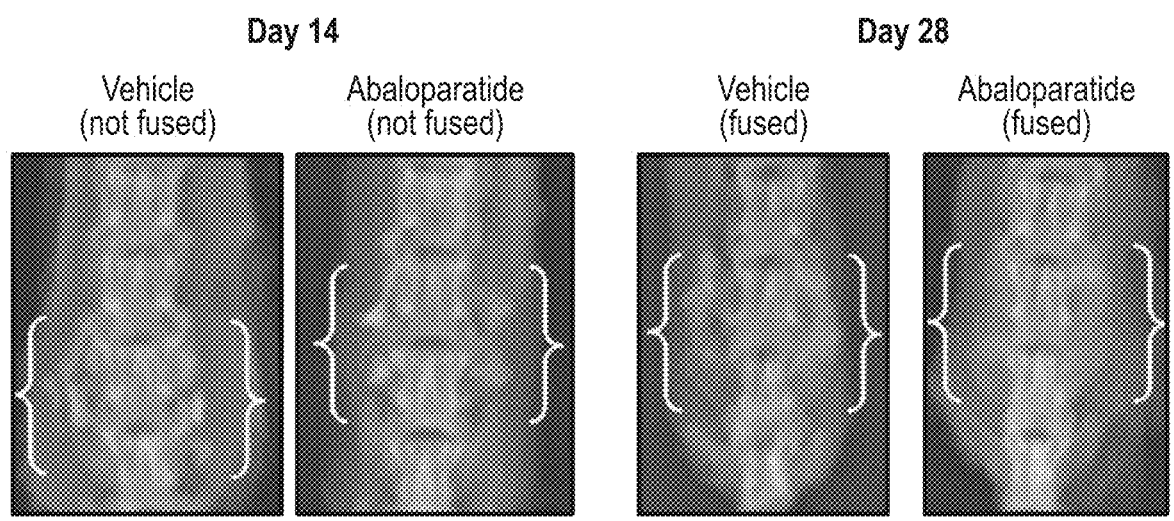

Radiographs at 2 and 4 weeks showed qualitatively normal healing responses over time. Loss of graft distinction at the host bone margins indicated progression of host site integration, new bone formation, and bone remodeling over time. Blinded scoring of radiographic fusion by three independent reviewers indicated that none of the vehicle or abaloparatide-treated animals achieved unilateral or bilateral fusion at day 14 (FIG. 4A). At day 28, 2 of 8 rats in the vehicle group and 4 of 8 rats in the abaloparatide group achieved radiographic fusion bilaterally, with no other animals achieving unilateral or bilateral fusion (FIG. 4A). There was 100% concordance among reviewers on fusion status at the individual animal level. FIG. 4C depicts radiographs of representative unfused and fused examples at day 14 and 28, respectively.

Fusion status by Manual palpation. Similar to radiographic fusion assessments, fusion evaluation by manual palpation showed no fusions in either treatment group at day 14, whereas 2 of 8 vehicle control animals and 4 of 8 abaloparatide animals were fused at day 28 (FIG. 4B). There was 100% concordance among reviewers for manual palpation assessments, and all individual animals deemed fused or unfused by manual palpation were also deemed fused or unfused by blinded radiography and by unblinded review of micro-CT reconstructions.

Example 2: Abaloparatide Enhances Fusion and Bone Formation in a Rabbit Spinal Arthrodesis Model Lumbar arthrodesis is a common orthopedic surgical technique with a broad range of indications. Pseudoarthrosis, or failed bony fusion, is an unfortunate complication in a significant number of cases. In addition to causing recurrent pain and other symptoms for the patient, pseudoarthrosis often results in follow-up appointments and revision surgeries. These represent a substantial financial burden that could be reduced with improved rates of bony fusion. Data presented herein demonstrated that abaloparatide has a significant effect on intervertebral lumbar fusion rate, quality, and volume in rabbits.

With approval from IACUC for all procedures, 24 skeletally mature male New Zealand White rabbits underwent posterolateral spinal fusion surgery. Starting 4 days postoperatively the rabbits received daily subcutaneous injections, with half of the group receiving abaloparatide injections (25 µg/kg/d) and the other half receiving saline solution injections of equivalent volume. 6 weeks after surgery, all rabbits were euthanized, in vivo radiographs were taken, and lumbar spine segments were explanted. These spine segments were subjected to blind manual assessment of fusion (MAF) testing, microCT imaging, biomechanical force testing, and bone histomorphology. Region of Interest (ROI) quantification was performed on microCT images to measure bone fusion mass. Post-sac radiographs were analyzed using a scoring system ("0" [no bone] through "5" [definite fusion]) and scores were averaged for abaloparatide and control groups.

Figure 5A:
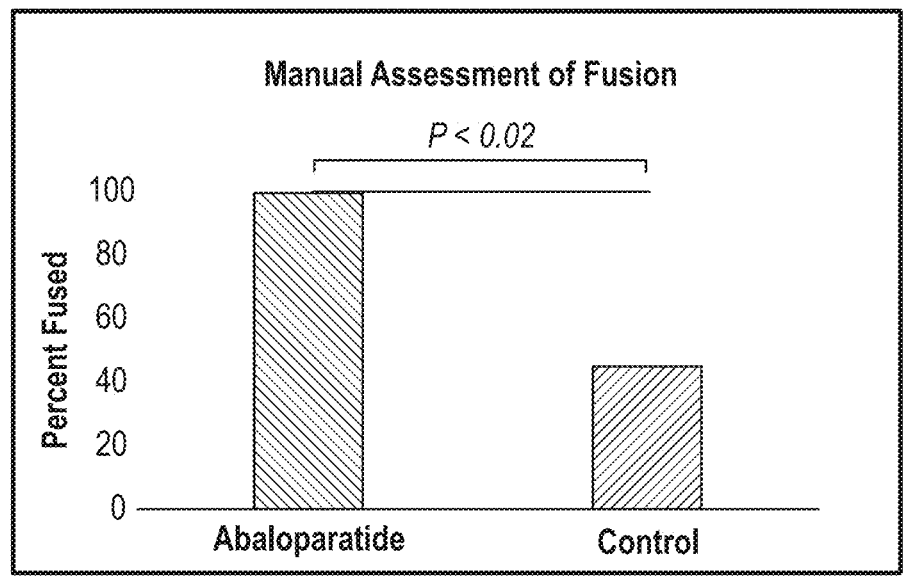
FIGS. 5A-B show the enhancement of fusion by abaloparatide treatment in a Rabbit Spinal Arthrodesis Model.

Analysis of Fusion status. A total of 21 rabbits completed the study. Successful fusion occurred in 45% (5/11) of control animals vs 100% (10/10) of abaloparatide animals. Three rabbits did not survive surgical anesthesia, leaving 11 rabbits in the control group and 10 in the abaloparatide group. MAF testing identified successful fusion in 45% (5/11) of control animals vs 100% (10/10) of abaloparatide animals (Fisher exact test P<0.02) (FIG. 5A).

Figure 5B:
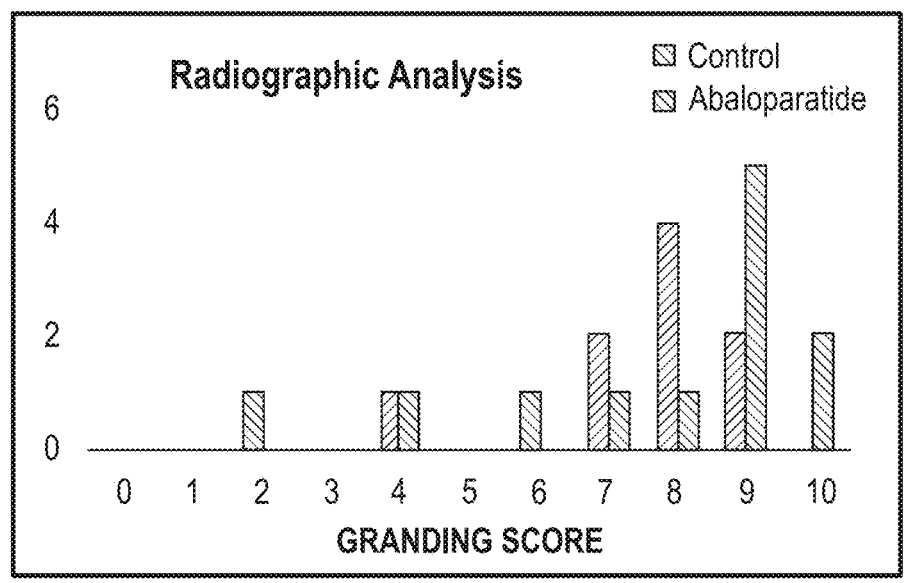
Figure 6A:
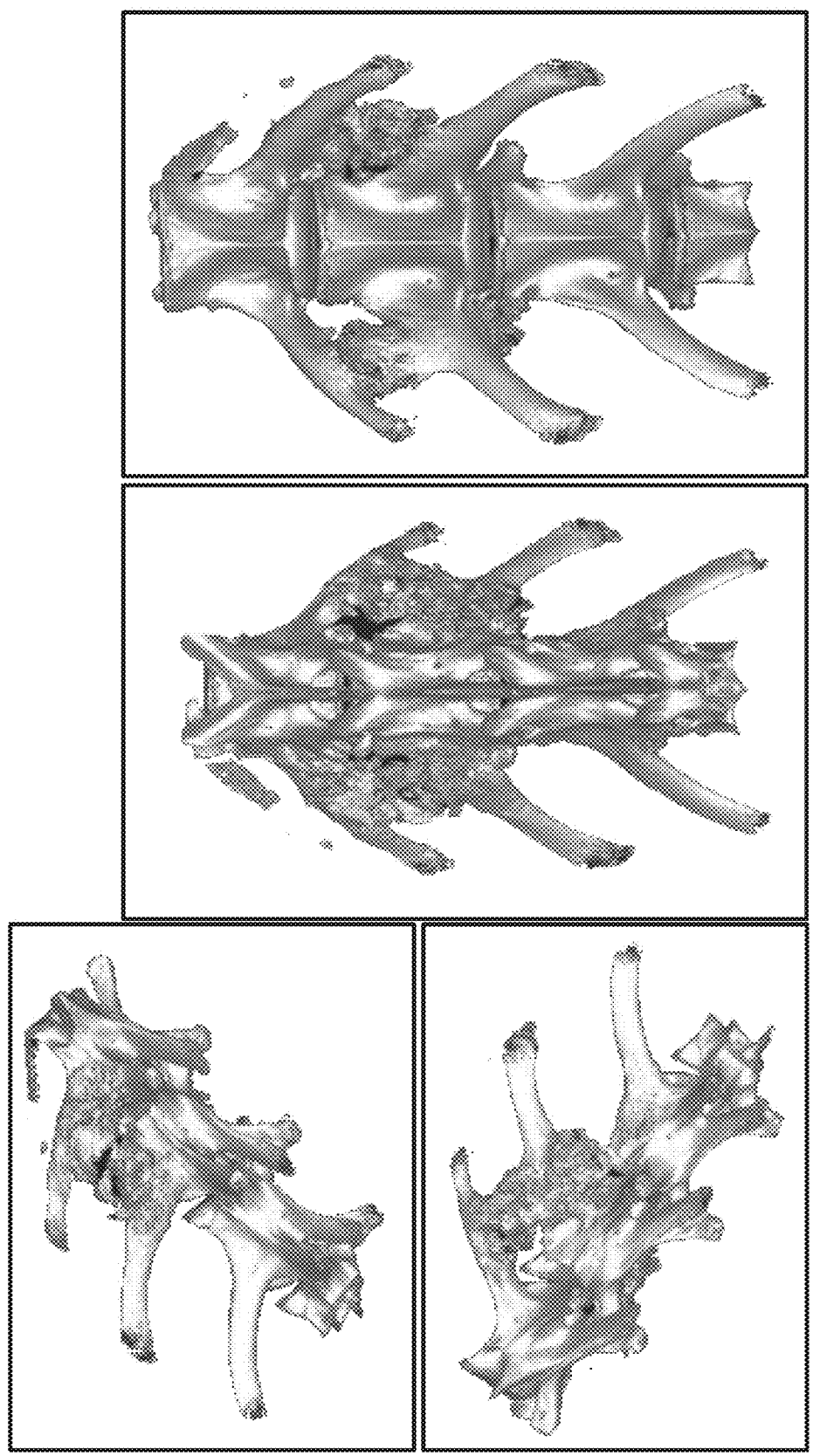
FIGS. 6A-B show radiographic fusion.
Figure 6B:
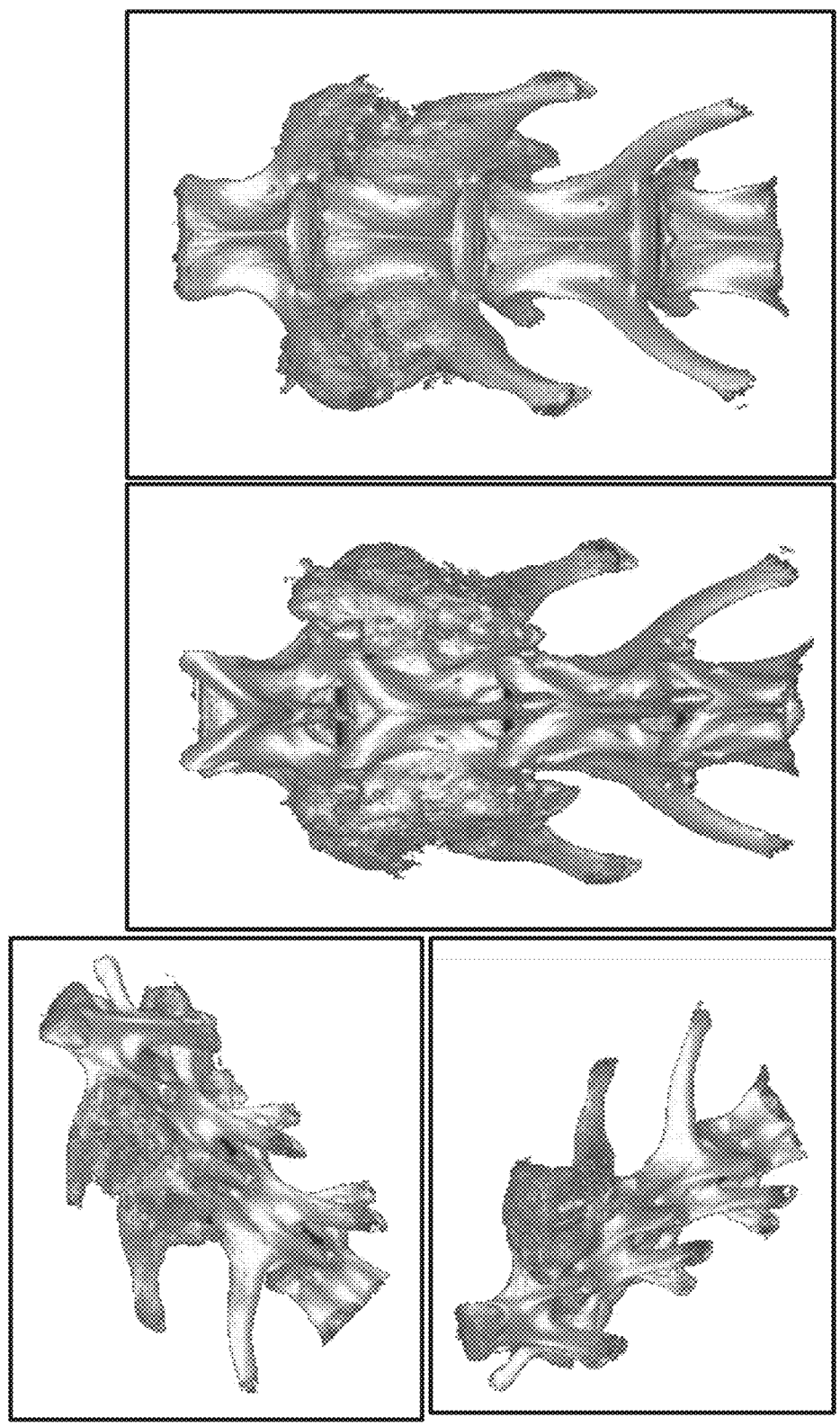

Radiographic analysis was performed on the rabbits in both the abaloparatide and control groups. Radiographic analysis uses the sum of both fusion scores per rabbit (2 fusion sites, each scored 0-5 and summed for a final 0-10 score, given that successful fusion relies on the interdependence of both). A final score of 0-4.5 indicates that fusion is unlikely, a score of 5-6.5 indicates possible fusion (considered to be in agreement with either fused or unfused from MAF) and a score of 7-10 indicates that fusion is likely. Radiographic analysis found an average score of 8.4 in the abaloparatide-treated animals versus 6.9 in the saline control treated animals (FIG. 5B). FIG. 6A and FIG. 6B show representative radiographs depicting the extent of spinal fusions in saline control and abaloparatide treated rabbit groups, respectively.

Thirteen out of fifteen rabbits identified as fused by MAF were also identified as fused or possibly fused by radiographic analysis. Results from two out of the fifteen rabbits (an abaloparatide treated rabbit and a rabbit in the saline control group) were in disagreement as both the rabbits were identified as fused by MAF but had a summed score of less than 4.5. The abaloparatide treated rabbit that exhibited a disagreement between the MAF and radiographic analysis, had a higher radiographic score sum (4.33) than the control rabbit (3.67) that exhibited the disagreement. For spines identified as unfused by MAF, three out of six rabbits were also identified as unfused by radiographic analysis using the same method. Three out of six rabbits were in disagreement with all three rabbits identified as unfused by MAF and likely fused by radiographic analysis.

Figure 7A:
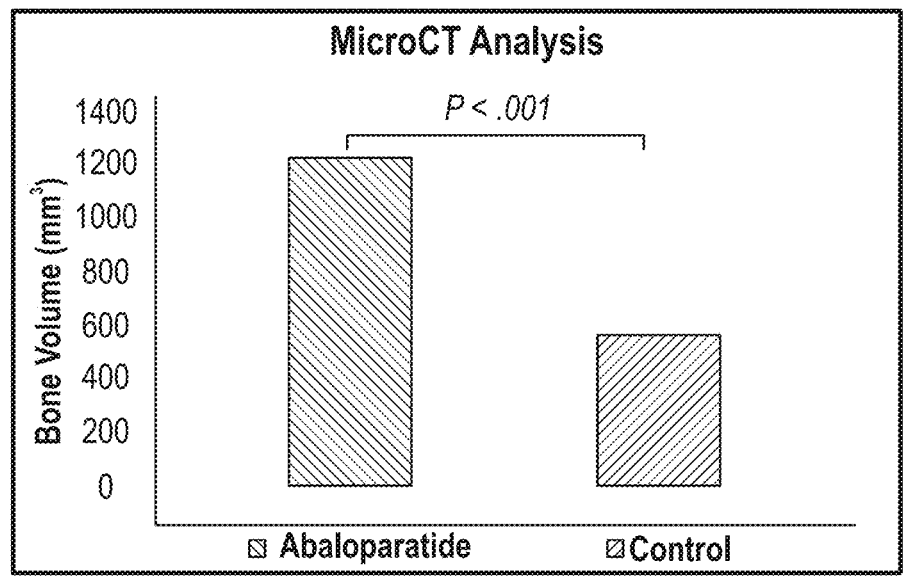
FIGS. 7A-B show increased bone volume in abaloparatide treated Rabbit Spinal Arthrodesis Model.
Figure 7B:
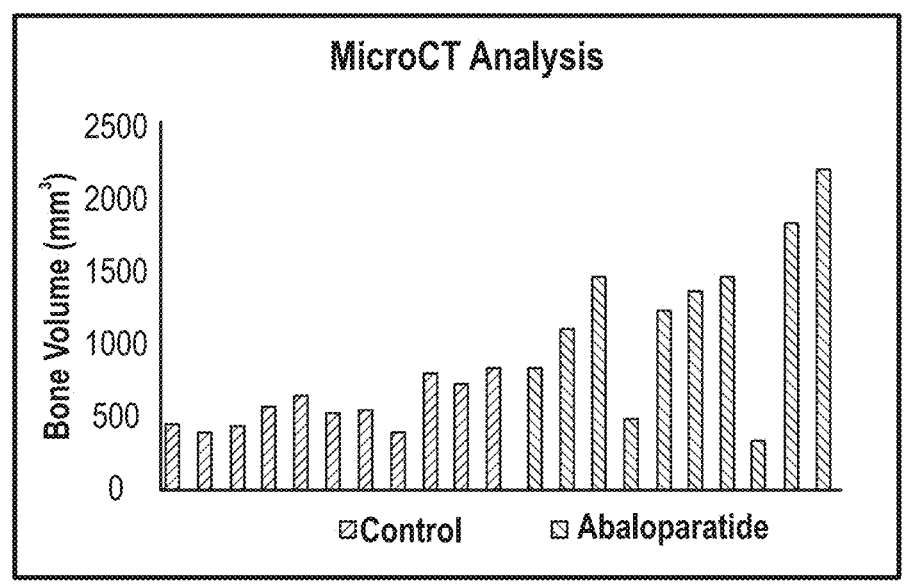

Micro CT analysis was performed on eleven rabbits in the control group and ten rabbits in the abaloparatide group. ROI quantification using microCT found significantly higher bone volume in abaloparatide treated animals compared with controls (1173 mm3 vs. 520 mm3, P<0.001, unpaired t-test). The results indicated that that abaloparatide treated rabbits had an increased bone volume compared to the rabbits in the control group (FIG. 7A-7B).

Example 3: Abaloparatide Improves the Strength of the Vertebral Body in Addition to Enhancing Fusion Mass in a Rabbit Spinal Arthrodesis Model High-resolution peripheral quantitative computed tomography (HR-pQCT) scans of the fused lumbar vertebrae of rabbits from a study sponsored by Radius Healthcare were sent to Beth Israel Deaconess Medical Center (BIDMC) for analysis of trabecular bone microarchitecture. The goal of the analysis at BIDMC was to determine whether treatment with Abaloparatide (ABL) improved vertebral trabecular bone architecture following spinal fusion surgery. The trabecular bone was analyzed in the caudal aspect of the body of a vertebra that was fused to the vertebra caudal to it. Relative to the saline treated control group (n=10), rabbits treated with ABL (n=9) had significantly greater trabecular bone volume fraction (Tb.BV/TV, +17%) and trabecular thickness (Tb.Th, +17%) and lower specific bone surface (BS/BV, −20%) and connectivity density (Conn.D, −22%). ABL treatment did not impact trabecular number (Tb.N) or separation (Tb.Sp). Scans that were provided to BIDMC were not calibrated for mineral density, so it was not possible to measure the mineral density if the trabecular bone. Data presented herein demonstrated that treatment with abaloparatide may improve the strength of the vertebral body in addition to enhancing fusion mass.

Figure 8A:
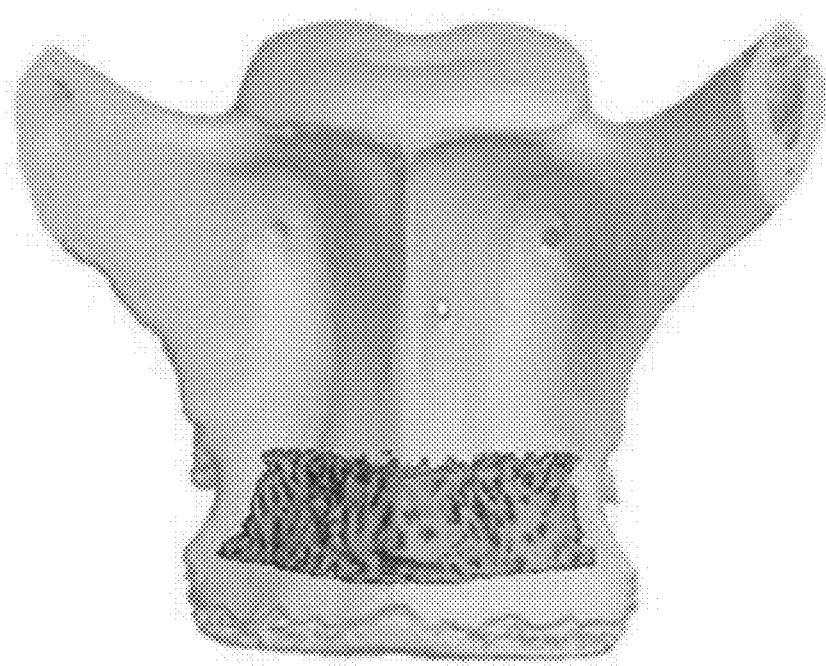
FIGS. 8A-B show views of the trabecular region of interest.
Figure 8B:
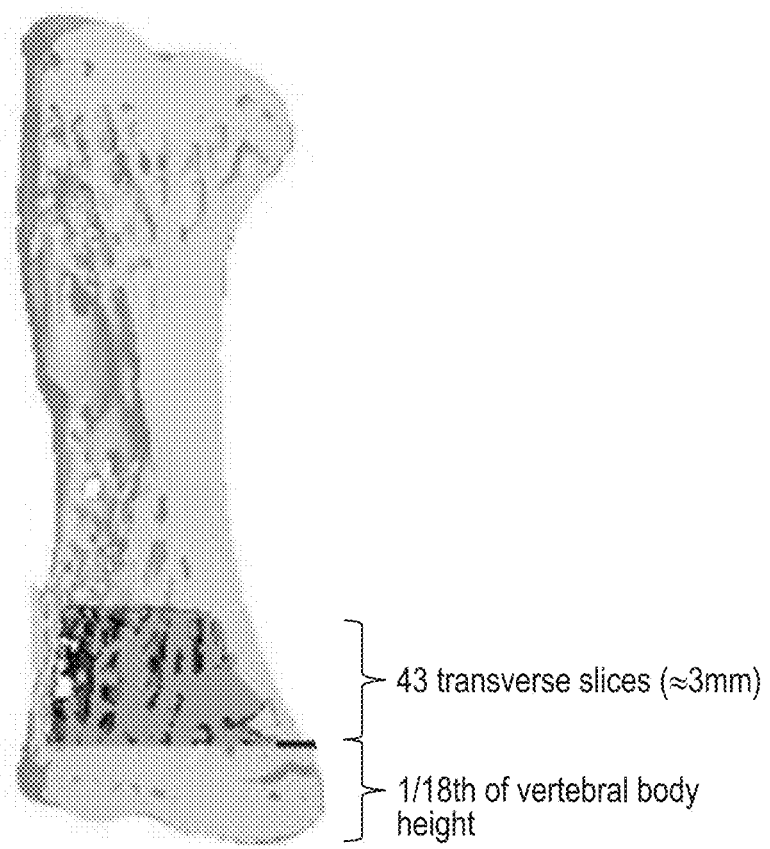

Trabecular microarchitectural analysis was performed at Beth Israel Deaconess Medical Center (BIDMC) on HR-pQCT scans that were acquired at the Hospital for Special Surgery. Scans that were reconstructed with a 72 µm isotropic voxel size were pre-processed at BIDMC and imported into micro-computed tomography analysis software (Scanco Medical software suite, Brüttisellen, Switzerland) for analysis. Trabecular architecture was analyzed in the endocortical region of the caudal aspect of the body of the more cranial of the two fused vertebrae, in a region beginning ⅛th of the vertebral body height superior to the distal end of the vertebral body and extending cranially 43 slices (≈3 mm) (FIGS. 8A-B). Adaptive iterative thresholding (AIT) was performed to determine the segmentation threshold used to segment bone from soft-tissue in each scan and then the standard Scanco trabecular bone morphometry script was used to measure the following trabecular architectural parameters: bone volume fraction (Tb.BV/TV, %), trabecular specific bone surface (Tb.BS/BV, $mm^2/mm^3$), trabecular thickness (Tb.Th, mm), trabecular number (Tb.N, $mm^{-1}$), trabecular separation (Tb.Sp, mm), and connectivity density (ConnD, $1/mm^3$).

Figure 10:
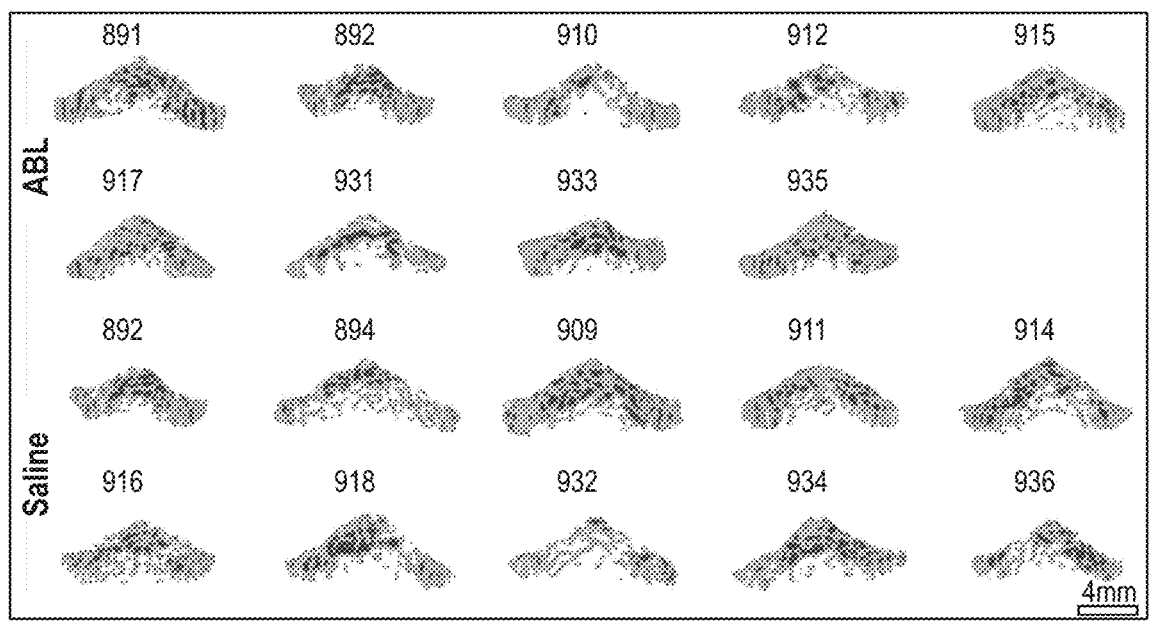
FIG. 10 shows plots representative images of the trabecular bone. The images are of a 720 μm thick section (10 transverse slices) within the trabecular region of interest.

Analysis of Distal Vertebral Body Trabecular Architecture. Trabecular results are presented in plots (FIGS. 9A-F) and Table 3. Plots are mean±SD with the individual data points overlaid. The value at the top of each plot is the p-value of an un-paired, two-tailed t-test comparing the ABL and saline treated groups. Representative images of the trabecular bone are presented in FIG. 10. The images are of a 720 µm thick section (10 transverse slices) within the trabecular region of interest described in the Methods section. Note that the images do not show all of the bone that was analyzed in the trabecular region of interest (which was 43 transverse slices in length). An explanation of each of the trabecular parameters is provided in Table 4.

TABLE 3

Trabecular bone microarchitecture results

Distal Vertebral Body Trabecular Bone Architecture

| Sample Name | Treatment# | Treatment | BV/TV (%) | BS/BV (mm²/mm³) | Conn.D. (1/mm³) | Tb.N (1/mm) | Tb.Th (mm) | Tb.Sp (mm) |
|---|---|---|---|---|---|---|---|---|
| 891 | 1 | ABL | 53.77 | 5.18 | 2.77 | 2.00 | 0.341 | 0.439 |
| 893 | 1 | ABL | 52.76 | 5.48 | 3.45 | 2.16 | 0.341 | 0.408 |
| 910 | 1 | ABL | 47.63 | 5.24 | 2.28 | 1.51 | 0.358 | 0.704 |
| 912 | 1 | ABL | 44.21 | 6.09 | 2.35 | 1.89 | 0.290 | 0.469 |
| 915 | 1 | ABL | 53.66 | 5.28 | 3.60 | 2.19 | 0.358 | 0.463 |
| 917 | 1 | ABL | 58.47 | 4.71 | 3.47 | 2.25 | 0.351 | 0.417 |
| 931 | 1 | ABL | 51.20 | 4.60 | 1.35 | 1.64 | 0.340 | 0.573 |
| 933 | 1 | ABL | 65.88 | 3.58 | 1.42 | 2.10 | 0.421 | 0.491 |
| 935 | 1 | ABL | 68.10 | 3.88 | 3.35 | 2.48 | 0.366 | 0.354 |
| 892 | 2 | Saline | 53.96 | 5.29 | 3.43 | 2.33 | 0.305 | 0.374 |
| 894 | 2 | Saline | 45.08 | 6.14 | 3.16 | 1.96 | 0.345 | 0.475 |
| 909 | 2 | Saline | 47.44 | 6.22 | 3.59 | 1.92 | 0.300 | 0.515 |
| 911 | 2 | Saline | 50.65 | 5.99 | 3.36 | 2.18 | 0.313 | 0.393 |
| 914 | 2 | Saline | 44.98 | 6.35 | 3.86 | 2.05 | 0.296 | 0.477 |
| 916 | 2 | Saline | 53.20 | 5.57 | 3.72 | 2.44 | 0.309 | 0.355 |
| 918 | 2 | Saline | 41.76 | 6.43 | 3.16 | 1.78 | 0.282 | 0.570 |
| 932 | 2 | Saline | 42.24 | 6.51 | 3.27 | 1.77 | 0.284 | 0.531 |
| 934 | 2 | Saline | 46.76 | 6.43 | 3.91 | 2.05 | 0.275 | 0.450 |
| 936 | 2 | Saline | 45.65 | 5.91 | 2.75 | 1.87 | 0.301 | 0.496 |
| ABL (n = 9) | | Mean | 55.08 | 4.89 | 2.67 | 2.03 | 0.352 | 0.480 |
| | | SD | 7.87 | 0.79 | 0.88 | 0.30 | 0.034 | 0.104 |
| Saline (n = 10) | | Mean | 47.17 | 6.08 | 3.42 | 2.04 | 0.301 | 0.464 |
| | | SD | 4.21 | 0.40 | 0.36 | 0.23 | 0.020 | 0.071 |
| | | t-test P-Value | 0.0131 | 0.0006 | 0.0229 | 0.9324 | 0.0008 | 0.6946 |

^p-value of an un-paired, two-tailed t-test comparing the ABL and Saline treated groups

TABLE 4

Trabecular bone microarchitecture results

| Variable Name | Abbreviation | Units | Definition |
|---|---|---|---|
| Bone volume Fraction | BV/TV | % | Amount of relative bone in a defined volume |
| Trabecular Specific Bone Surface | BS/BV | mm²/mm³ | Ratio of the segmented bone surface to the segmented bone volume |
| Trabecular Thickness | Tb.Th | mm | Average thickness of individual trabeculae |
| Trabecular Number | Tb.N | mm⁻¹ | Average number of trabeculae per mm. of bone |
| Trabecular separation | Tb.Sp | mm | Average distance separating individual trabeculae |
| Connectivity Density | Conn.D | mm⁻³ | Measure of density of intricacies formed by a trabecular bone mesh throughout a given volume. |

The invention claimed is:

1. A method of treating a subject having a spinal fusion surgery, the method comprising administering a therapeutically effective amount of abaloparatide to the subject after having the spinal fusion surgery, wherein the administration is daily subcutaneous administration of 80 µg abaloparatide; wherein the treatment enhances spinal fusion, bone formation, or both, without elevating bone resorption; and wherein the enhanced spinal fusion or bone formation is determined by a CT scan.

2. The method of claim 1, wherein the spinal fusion surgery involves implantation in the subject of a device comprising one or more of screws, spinal wires, artificial ligaments, vertebral cages, and artificial disks.

3. The method of claim 2, wherein the spinal fusion surgery is an anterior or a posterior surgery.

4. The method of claim 3, wherein the posterior surgery is a posterolateral fusion.

5. The method of claim 1, wherein the abaloparatide is administered daily for at least 2 months, 3 months, 4 months, 6 months, 12 months or 18 months.

6. The method of claim 1, wherein the administration enhances spinal fusion between two adjacent vertebrae, or between multiple vertebrae.

7. The method of claim 1, wherein administering the therapeutically effective amount of abaloparatide elevates bone formation markers without elevating bone resorption markers.

8. The method of claim 7, wherein the bone formation marker is selected from the group consisting of osteocalcin (OC), N-terminal propeptide of type I procollagen (PINP), and bone-specific alkaline phosphatase (BAP).

9. The method of claim 8, wherein the bone formation marker is osteocalcin (OC) or N-terminal propeptide of type I procollagen (PINP).

10. The method of claim 7, wherein the bone resorption marker is selected from the group consisting of tartrate-resistant acid phosphatase 5b (TRAcP-5b), hydroxyproline (total and dialyzable, Hyp), hydroxylysine glycosides, pyridinoline (PYD), deoxypyridinoline (DPD), carboxy-terminal cross-linked telopeptide of type I collagen (ICTP, CTX-MMP), bone sialoprotein (BSP), and cathepsins.

11. The method of claim 10, wherein the bone resorption marker is TRACP-5b.

* * * * *

SEQUENCE LISTING

```
<160> NUMBER OF SEQ ID NOS: 2

<210> SEQ ID NO 1
<211> LENGTH: 34
<212> TYPE: PRT
<213> ORGANISM: Homo sapiens

<400> SEQUENCE: 1

Ala Val Ser Glu His Gln Leu Leu His Asp Lys Gly Lys Ser Ile Gln
1               5                   10                  15

Asp Leu Arg Arg Arg Phe Phe Leu His His Leu Ile Ala Glu Ile His
            20                  25                  30

Thr Ala

<210> SEQ ID NO 2
<211> LENGTH: 34
<212> TYPE: PRT
```

```
<213> ORGANISM: Artificial Sequence
<220> FEATURE:
<223> OTHER INFORMATION: Synthetic PTHrP analogue (Abaloparatide)
<220> FEATURE:
<221> NAME/KEY: MOD_RES
<222> LOCATION: (29)..(29)
<223> OTHER INFORMATION: 2-aminoisobutyric acid

<400> SEQUENCE: 2

Ala Val Ser Glu His Gln Leu Leu His Asp Lys Gly Lys Ser Ile Gln
1               5                   10                  15

Asp Leu Arg Arg Arg Glu Leu Leu Glu Lys Leu Leu Xaa Lys Leu His
            20                  25                  30

Thr Ala
```